(12) United States Patent
Kikuchi et al.

(10) Patent No.: US 12,122,467 B2
(45) Date of Patent: Oct. 22, 2024

(54) MOVING DEVICE

(71) Applicant: TOKYO KEIKI INC., Tokyo (JP)

(72) Inventors: Tooru Kikuchi, Tokyo (JP); Takao Murakoshi, Tokyo (JP); Kenji Tsuchiya, Tokyo (JP)

(73) Assignee: Tokyo Keiki Inc., Tokyo (JP)

( * ) Notice: Subject to any disclaimer, the term of this patent is extended or adjusted under 35 U.S.C. 154(b) by 532 days.

(21) Appl. No.: 17/600,688

(22) PCT Filed: May 30, 2019

(86) PCT No.: PCT/JP2019/021602
§ 371 (c)(1),
(2) Date: Oct. 1, 2021

(87) PCT Pub. No.: WO2020/240791
PCT Pub. Date: Dec. 3, 2020

(65) Prior Publication Data

US 2022/0177060 A1    Jun. 9, 2022

(51) Int. Cl.
*B62D 57/024*    (2006.01)
(52) U.S. Cl.
CPC .................. *B62D 57/024* (2013.01)
(58) Field of Classification Search
CPC .................................................. B62D 57/024
See application file for complete search history.

(56) References Cited

U.S. PATENT DOCUMENTS

| 7,520,356 | B2 * | 4/2009 | Sadegh | .................. | B62D 53/00 |
| | | | | | 180/164 |
| 10,836,446 | B2 * | 11/2020 | Sekiguchi | ............... | B60B 15/18 |
| 2007/0235238 | A1 | 10/2007 | Sadegh et al. | | |
| 2013/0140801 | A1 | 7/2013 | Schlee et al. | | |

FOREIGN PATENT DOCUMENTS

| CN | 103253314 A | 8/2013 |
| CN | 103624765 A | 3/2014 |
| CN | 205034206 U | 2/2016 |
| CN | 205906090 U | 1/2017 |
| CN | 206218047 U | 6/2017 |
| CN | 106945739 A | 7/2017 |
| JP | H01-17911 B2 | 4/1989 |

(Continued)

OTHER PUBLICATIONS

Corresponding International Patent Application No. PCT/JP2019/021602, International Search Report, date mailed Jul. 9, 2019. English translation.

(Continued)

*Primary Examiner* — Kevin Hurley
(74) *Attorney, Agent, or Firm* — Cooper Legal Group LLC

(57) ABSTRACT

A moving device for moving on a wall surface that includes at least two or more vehicles each having a body, two main wheels each disposed on the body and rotatable around a shaft for moving on a wall surface, two rotation drivers which rotate each of the two main wheels respectively, and an adhesion mechanism disposed on the body to adhere onto the wall surface; and a coupler that connects vehicles located adjacent to each other among the at least two or more vehicles in the traveling direction of each of the vehicles.

18 Claims, 19 Drawing Sheets

(56) References Cited

FOREIGN PATENT DOCUMENTS

| | | |
|---|---|---|
| JP | H04-315586 A | 11/1992 |
| JP | H08-198104 A | 8/1996 |
| JP | 2003-062771 A | 3/2003 |
| JP | 2005-319973 A | 11/2005 |
| JP | 2015-505763 A | 2/2015 |
| JP | 5832690 B1 | 12/2015 |
| WO | WO-2014072556 A1 * 5/2014 ........... B62D 57/024 |

OTHER PUBLICATIONS

Corresponding European Patent Application 19930210.0, Extended European Search Report dated Mar. 18, 2022, 7 pages.
Corresponding Korean Patent Application 10-2021-7039739, Office Action dated Jul. 27, 2023, 12 pages.

* cited by examiner

MOVING DEVICE

TECHNICAL FIELD

The present invention relates to a moving device that can move on wall surfaces.

BACKGROUND ART

Robots that can move on wall surfaces have been in use as moving devices for inspecting structures. As a robot of this type, one that can move on walls by adhering to the wall surfaces has been proposed, wherein the adhesion methods include propellers pushing against the wall, vacuum adhesion with a vacuum pump or fan, and attraction of walls using magnetic forces, electrostatic forces, or intermolecular forces.

If robots are to move stably by adhering on the walls of structures such as bridge piers, box girders, or building exterior walls, i.e., made of electrically insulating material such as concrete, vacuum adhesion using a vacuum pump or a fan is particularly effective among the above-mentioned adhesion methods. In vacuum adhesion, the air in the space between the robot and the surface to be adhered to is exhausted to depressurize the space, and the robot is adhered to the surface by the difference of pressure between the space and the atmosphere.

In the related art, a structural inspection robot is known that comprises a body disposed with an inspection device, a pair of front wheels and a pair of rear wheels each of which having a plurality of magnets disposed on the outer diameter arranged in the circumferential direction and cone-shaped contact parts disposed on both sides in the width direction, wherein the front and rear wheels rotate while adhering to the steel members of a bridge to make the robot move along the steel members (see Patent Document 1).

CITATION LIST

Patent Document

[Patent Document 1] JP5832690

DISCLOSURE OF THE INVENTION

Problems to be Solved by the Invention

In the case of vacuum adhesion, as the wall surfaces on which robots are to adhere to often have gaps and irregularities that reduce the adhesion force drastically thereon and the robots cannot keep adhering to the wall nor move stably on such wall surfaces.

In response to the above issue, it is an object of the present invention to provide a moving device that can move on wall surfaces more stably.

Means for Solving the Problems

A moving device for moving on a wall surface according to one aspect includes at least two or more vehicles each having a body, two main wheels each disposed on the body and rotatable around a shaft for moving on a wall surface, two rotation drivers which rotate each of the two main wheels respectively, and an adhesion mechanism disposed on the body to adhere onto the wall surface, and a coupler that connects vehicles located adjacent to each other among the at least two or more vehicles in the traveling direction of the vehicles.

Advantageous Effects of the Invention

An aspect of the present invention provides a moving device that can move on wall surfaces more stably.

BEST MODE FOR CARRYING OUT THE INVENTION

Moving devices according to the embodiments of the present invention will now be described with reference to the drawings.

A First Embodiment (Overall Configuration of a Moving Device)

Figure 1:
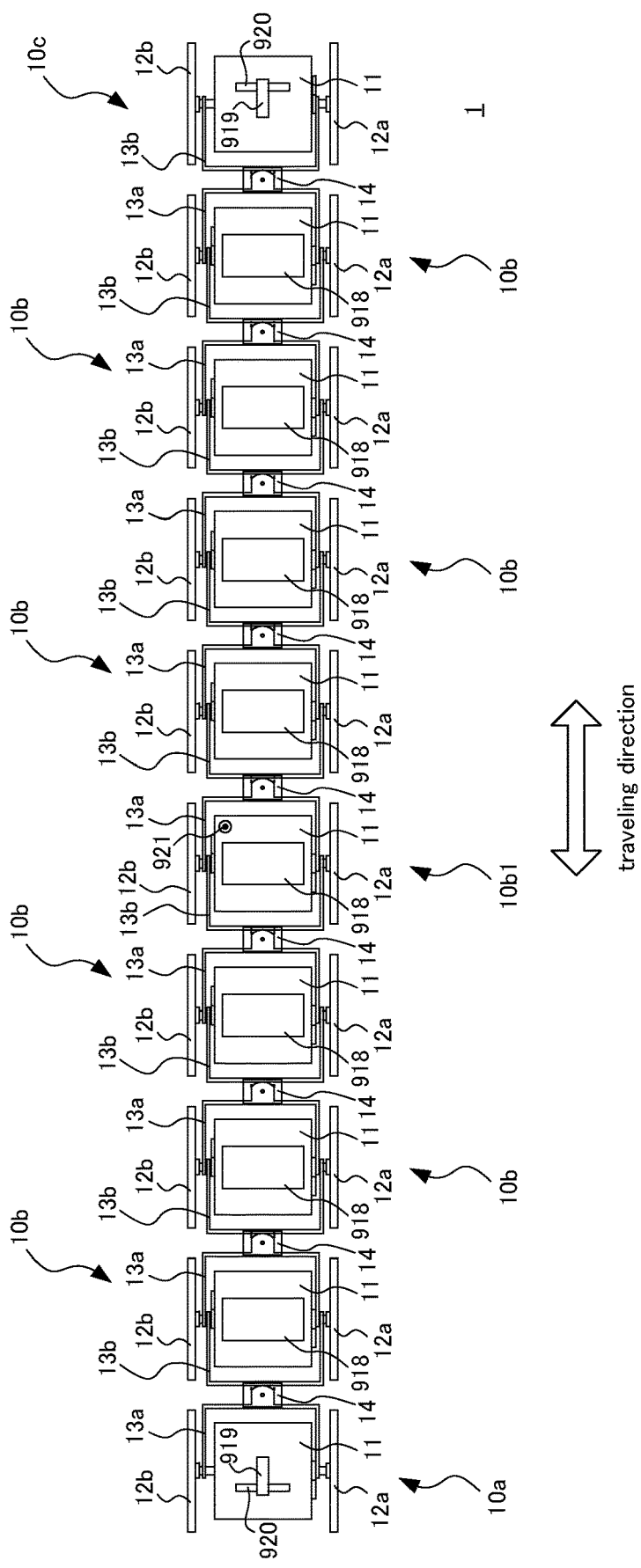
FIG. 1 is a schematic plan view illustrating a configuration of a moving device in the first embodiment.
Figure 2:
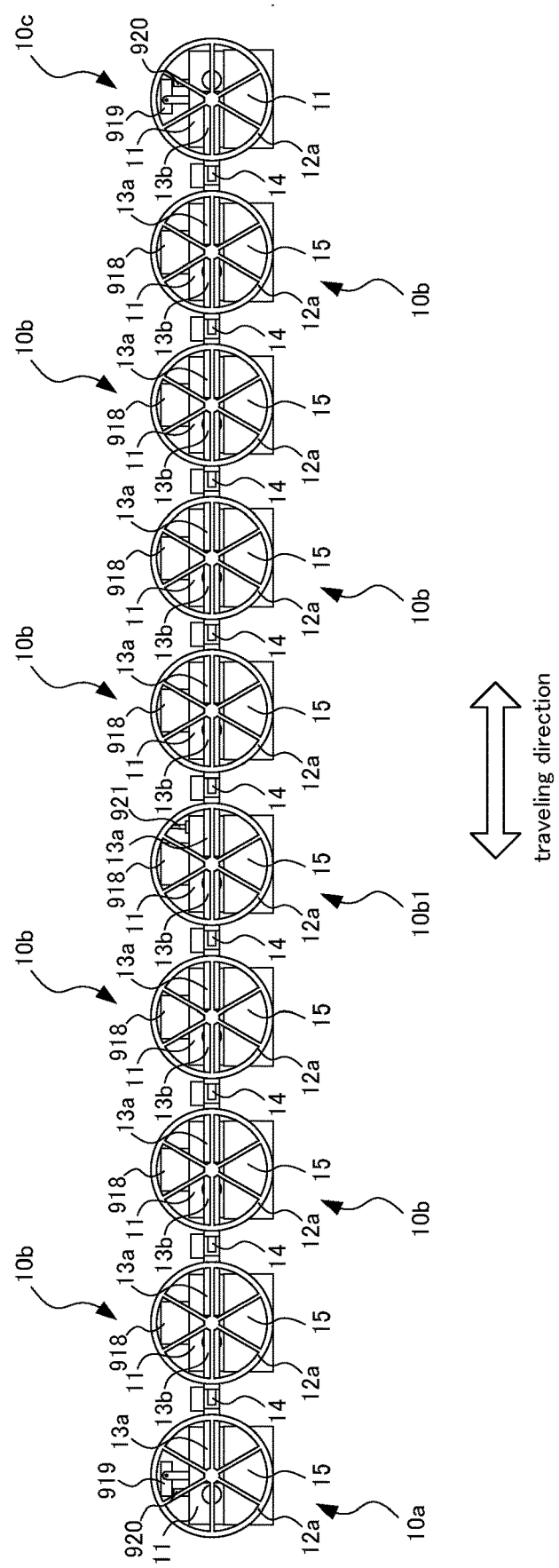
FIG. 2 is a schematic side view illustrating a configuration of a moving device in the first embodiment.

An overall configuration of a moving device according to the present embodiment is described. FIG. 1 is a schematic plan view illustrating the configuration of a moving device in the first embodiment. FIG. 2 is a schematic side view illustrating the configuration of a moving device in the first embodiment.

As illustrated in FIG. 1 and FIG. 2, the moving device 1 according to the present embodiment includes ten vehicles 10 (10a, 10b, 10b1, 10c) each disposed with two main wheels 12a, 12b. Each one of these vehicles 10 is capable of moving in at least one direction by means of two main wheels 12a, 12b, and vehicles adjacent to each other in the traveling direction are connected to each other. The moving device 1 may preferably have at least two vehicles 10.

In the following descriptions, one of the ten vehicles located at one end in the traveling direction is designated as vehicle 10a, another one located at the other end is designated as vehicle 10c, the other ones located between vehicles 10a, 10c are designated as vehicles 10b, and one of the vehicles 10b is designated as vehicle 10b1. As vehicles 10a, 10b, 10b1, 10c basically share a same configuration except in some specific parts, they will simply be referred to as vehicles 10 when there is no need to distinguish between them in a description. There are components designated with a number and an appended letter. A same number indicates a same configuration, and appended letters distinguish the components according to their different placement positions. When there is no need to distinguish the placement positions, those components are simply referred to only by the numbers.

When a moving device 1 moves on a plane, the direction perpendicular to the traveling direction of the moving device 1 and parallel to the plane is designated as lateral direction, and the direction perpendicular to the traveling direction and the lateral direction is designated as vertical direction. The vehicle 10a's end in the traveling direction is designated as front and the vehicle 10c's end is designated as rear, and the plane end in the vertical direction is designated as below and the other end is designated as above.

Each one of the vehicles 10 has a body 11, main wheels 12a, 12b on each side of the body 11 with shafts extending in the lateral direction, and a partition 15 below the body 11. The vehicle 10a has a first link 13a, which is a generally C-shaped member open to one side and rotatable around the shafts of the main wheels 12, a camera 919 above the body 11, and a shape measuring device 920. The vehicle 10b has a first link 13a, a second link 13b, which is a member with the same shape as the first link 13a and is rotatable around the shafts 121 of the main wheels 12 (see FIG. 3 and FIG. 4) in the same manner as the first link 13a, and a measuring device 918. Vehicle 10b1 has a first link 13a, a second link 13b, a measuring device 918, and a transmitter/receiver 921. Vehicle 10c has a second link 13b, a camera 919 and a shape measuring device 920. Each of the vehicles 10 is connected with a coupler 14 to another vehicle 10 immediately adjacent in the traveling direction.

The operator of the moving device 1 remotely controls the moving device 1 via a controller, which is not shown in the figure, and the transmitter/receiver 921 in the vehicle 10b1. Specifically, the operator controls the moving device 1 to move on a structure for inspection based on the images taken by the cameras 919 mounted on the vehicles 10a, 10c, and the shape information of the area around the moving device acquired by the shape measuring device 920. Each of the measuring devices 918 mounted on the vehicles 10b, 10b1 performs various measurements for inspection of the structure either in the middle of a moving path or at a target point where the moving device 1 has moved to. As the only difference between the vehicle 10b and vehicle 10b1 is the transmitter/receiver 921, the vehicle 10b and vehicle 10b1 will be referred to simply as vehicle 10b without distinguishing between them in the following description.

(Configuration of Vehicles)

Figure 3:
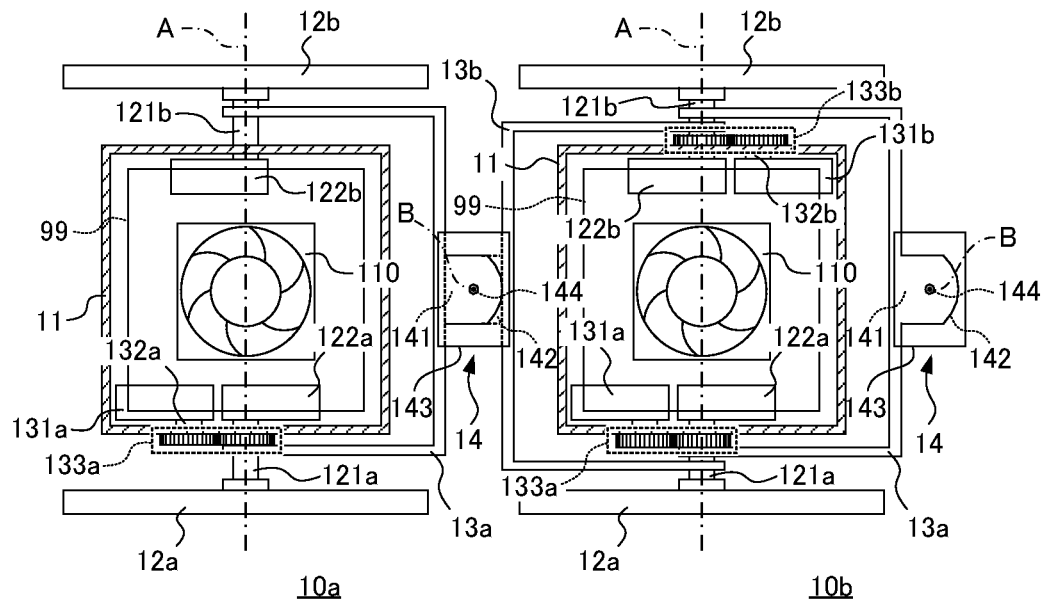
FIG. 3 is a schematic plan view illustrating a configuration of vehicles.
Figure 4:
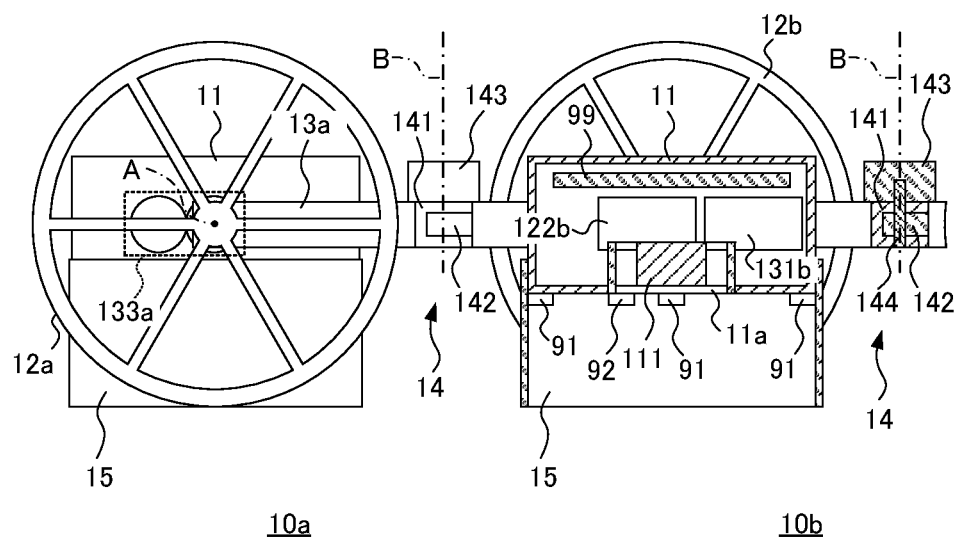
FIG. 4 is a schematic side view illustrating a configuration of vehicles.
Figure 5:
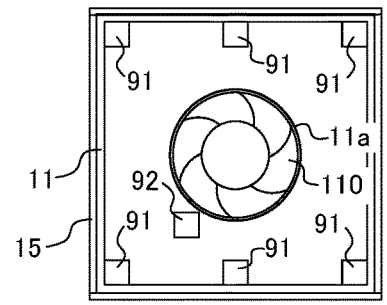
FIG. 5 is a schematic bottom view illustrating a configuration of a vehicle.

A configuration of vehicles in a moving device is described. FIG. 3 is a schematic plan view illustrating the configuration of vehicles. FIG. 4 is a schematic side view illustrating the configuration of vehicles. FIG. 5 is a schematic bottom view illustrating the configuration of a vehicle. In FIG. 3, the bodies of the vehicles are shown in cutaway view cut with a plane parallel to the traveling and lateral directions to show their interiors, and the control unit is shown transparently, which will be described later. In FIG. 4, the body, partition, and coupler of one of the vehicles are shown in cutaway view cut with a plane parallel to the traveling and vertical directions.

As shown in FIGS. 3 and 4, a housing space for housing various components is defined in the body 11 of each vehicle 10, and the components disposed in the housing space include, as a basic configuration of a vehicle, at least a fan 110 that constitutes an adhesion mechanism together with a partition 15, two traveling drivers 122a, 122b, and a control unit 99 that controls the operation of these components. The vehicle 10a, which has only a first link 13a, has a first pitch driver 131a in the housing space in addition to the basic configuration. The vehicles 10b, 10b1 having first and second links 13a, 13b are each disposed with a first pitch driver 131a and a second pitch driver 131b in the housing space in addition to the basic configuration. The vehicle 10c, not shown in FIG. 3 nor FIG. 4, having only the second link 13b, is only disposed with the second pitch driver 131b in the housing space in addition to the basic configuration.

In each vehicle 10, each of the main wheels 12a, 12b disposed at each end of the body 11 in the lateral direction has a shaft 121a or 121b oriented inwardly in the lateral direction, and each of the shafts 121a, 121b is connected respectively to a traveling driver 122a or 122b rotatably around the axis A The axis A is oriented in the lateral direction, and the shafts 121a, 121b rotate around the same axis A The body 11 is formed smaller than the main wheels 12 in all directions perpendicular to the lateral direction or the direction of axis A, that is in the radial direction of the main wheels 12. In other words, the main wheels 12 are formed with a larger diameter than the body 11 when viewed from the direction of the axis A.

The first link 13a on each of the vehicles 10a, 10b has two extension portions at both sides in the lateral direction of the body 11 that extend in the radial direction of the main wheels 12, i.e. generally perpendicular to the axis A of the shafts 121, for a distance of at least the radius of the main wheels 12, and a connecting portion that connects each one end of these two extension portions together, and is formed in a substantially C-shape. The other ends of the two extension portions are rotatably connected to the shafts 121 and are rotated around the axis A by a first pitch driver 131a. A transmission 133a comprising two gears is disposed on a first side in the lateral direction of the body 11. The first pitch driver 131a has a shaft 132a whose axis is oriented in the lateral direction. The first gear of the transmission 133a is fixedly connected to the shaft 132a. The second gear of the transmission 133a disposed rotatably around the shaft 121a and in mesh with the first gear is fixedly connected to the body 11, and is fixedly connected to the other end of one extension portion of the first link 13a. Thus, the first link 13a is driven to rotate relative to the shaft 121a around the axis A.

The second link 13b on each of the vehicles 10a, 10b has two extension portions at both sides in the lateral direction of the body 11 that extend generally in perpendicular to the axis A of the shafts 121, for a distance of at least the radius of the main wheels 12, and a connecting portion that connects each one end of these two extension portions together, and is formed in a substantially C-shape like in the first link 13a. The other ends of the two extension portions are rotatably connected to the shafts 121 and are rotated around the axis A by a second pitch driver 131b. A transmission 133b having two gears is disposed on a second side in the lateral direction of the body 11. The second pitch driver 131b has a shaft 132b whose axis is oriented in the lateral direction. The first gear of the transmission 133b is fixedly connected to the shaft 132b. The second gear of the transmission 133b disposed rotatably around the shaft 121b and in mesh with the first gear is fixedly connected to the body 11, and is fixedly connected to the other end of one extension portion of the second link 13b. Thus, the second link 13b is driven to rotate relative to the shaft 121b around the axis A.

In this embodiment, as the first link 13a and the second link 13b have the same configurations except that they are driven by either the first pitch driver 131a or the second pitch driver 131b, a same operation can be achieved with an alternative configuration where the second pitch driver 131b drives the first link 13a and the first pitch driver 131a drives the second link 13b. The essential difference between the first link 13a and the second link 13b is that the first link 13a is connected to the vehicle 10 adjacent to the rear, while the second link 13b is connected to the other vehicle 10 adjacent to the front.

The first link 13a and the second link 13b are mutually connected by a coupler 14 at their respective connecting portions. Such configuration allows the extension directions of the respective extension portions of the first link 13a and second link 13b to be oriented in the traveling direction unless the first pitch driver 131a or the second pitch driver 131b drives. By driving the first pitch driver 131a and the second pitch driver 131b, the body 11 can be rotated in the pitch direction relative to the wall surface, or the body 11 can be displaced vertically relative to the wall surface, as will be described below.

The coupler 14 includes a first coupling portion 141 connected to the connecting portion of the first link 13a, a second coupling portion 142 connected to the connecting portion of the second link 13b, and a yaw driver 143 having a shaft 144. The yaw driver 143 is fixed on the first coupling portion 141 with the axis B of the shaft 144 oriented in the vertical direction, and the shaft 144 is rotatably supported by the first coupling portion 141 and is fixedly connected to the second coupling portion 142. With this configuration, the first coupling portion 141 and the second coupling portion 142 are connected to each other in a manner mutually rotatable around the axis B. Rotationally driving the second coupling portion 142 around the axis B relative to the first coupling portion 141 makes one of the two vehicles 10 connected by the coupler 14 yawed, facilitating a change in the direction of travel of the moving device 1. The operation of the yaw driver 143 is controlled by the control unit 99 of the vehicle 10 disposed with the first link 13a to which the first coupling portion 141 is connected.

As shown in FIG. 4, the body 11 of the vehicle 10 is vertically separated by a predetermined distance from the wall surface with which the main wheels 12 are in contact when its attitude is not rotated pitch-wise, and an adhesion space is defined between the body 11 and the wall surface by a partition 15 enclosing from all directions perpendicular to the vertical direction. With a fan 111 discharging the air in the adhesion space to the outside, each of the vehicles 10 can be adhered to the wall surface. The air in the adhesion space is discharged outside of the vehicle 10 through discharge holes, not shown in the figure, disposed on the body 11. The partition 15 may preferably be made flexible.

As shown in FIG. 5, six proximity sensors 91 that each measures the distance to the wall surface and a pressure sensor 92 that measures the pressure in the adhesion space are disposed on the bottom of the body 11, that is, on the outer surface of the body 11 facing the adhesion space. The control unit 99 can acquire the values measured by the six proximity sensors 91 and the pressure sensor 92. The control unit 99 can detect the relative relationship between the body 11 and the wall surface such as orientation or vertical position of the body 11, based on mutual differences in the measured values of the six proximity sensors, and monitor a state of the adhesion to the wall surface by measured values of the pressure sensor 92. The proximity sensors 91 may preferably be provided in plurality, or alternatively a three-dimensional distance sensor can be used instead of a plurality of proximity sensors 91.

(Operation of the Moving Device)

Figure 6:
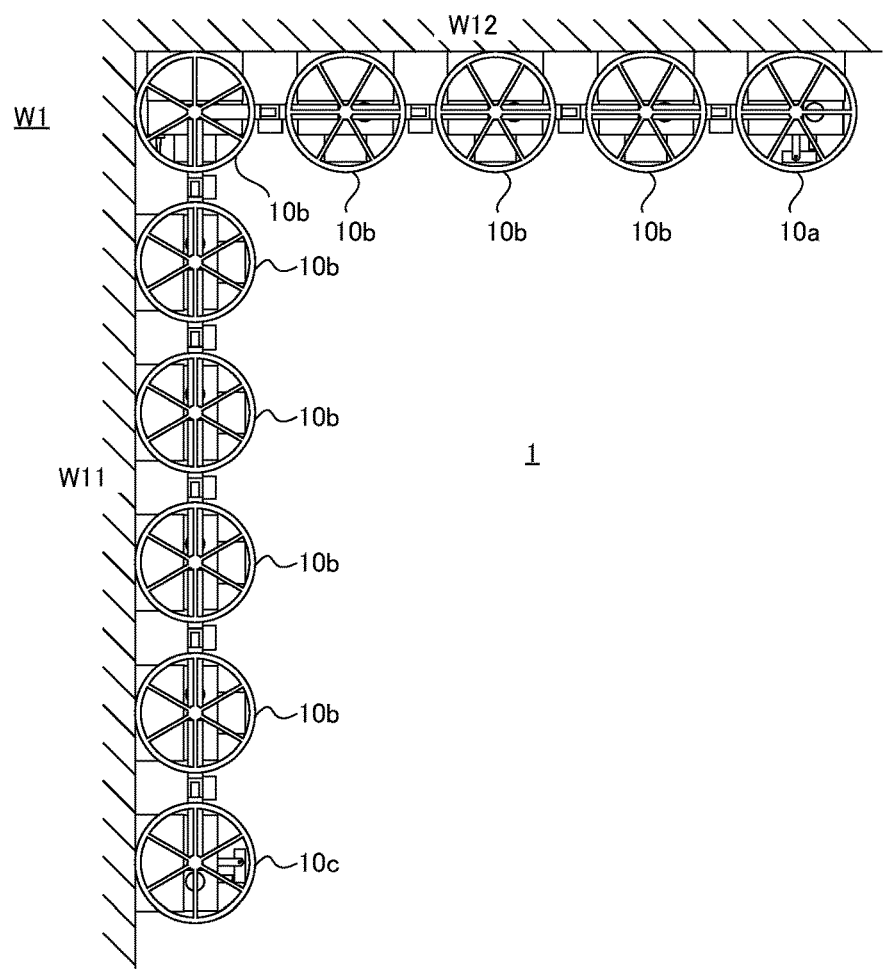
FIG. 6 is a schematic side view illustrating a moving device performing a rotation of bodies.
Figure 7:
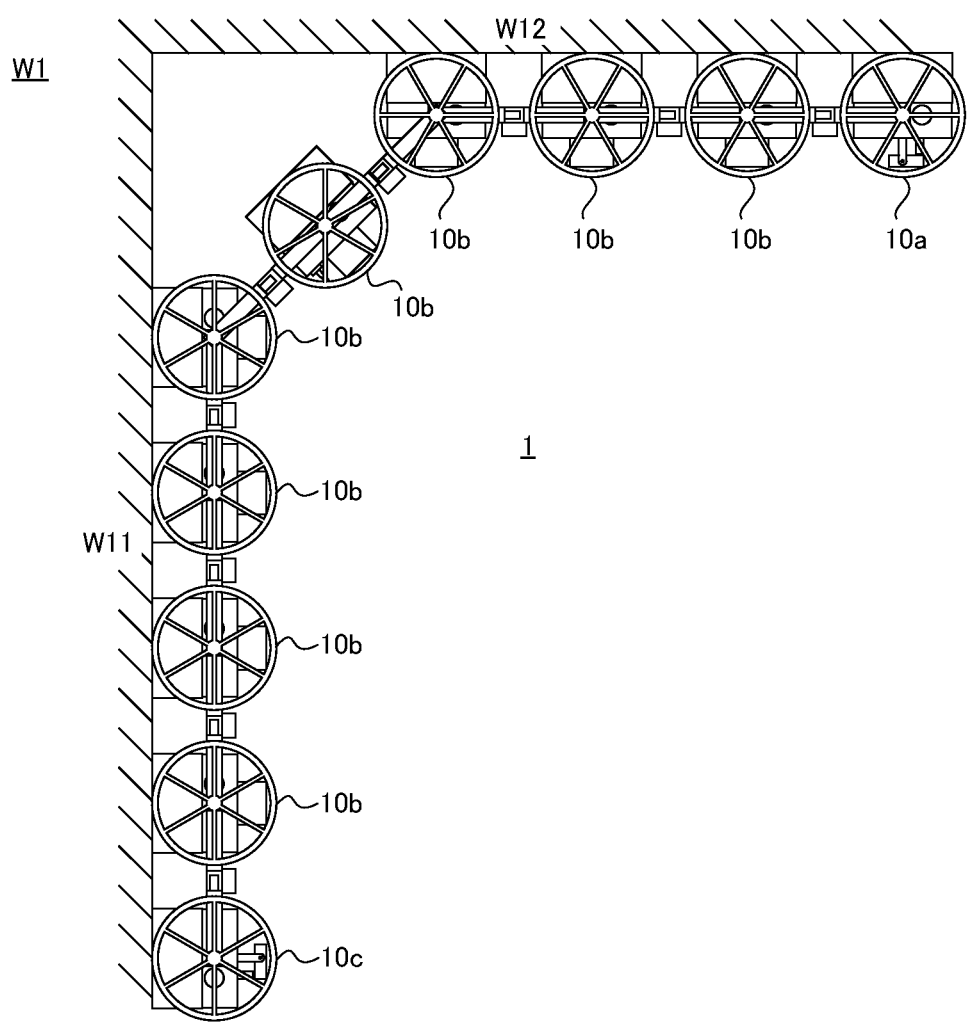
FIG. 7 is a schematic side view illustrating a moving device performing a pitch operation.
Figure 8:
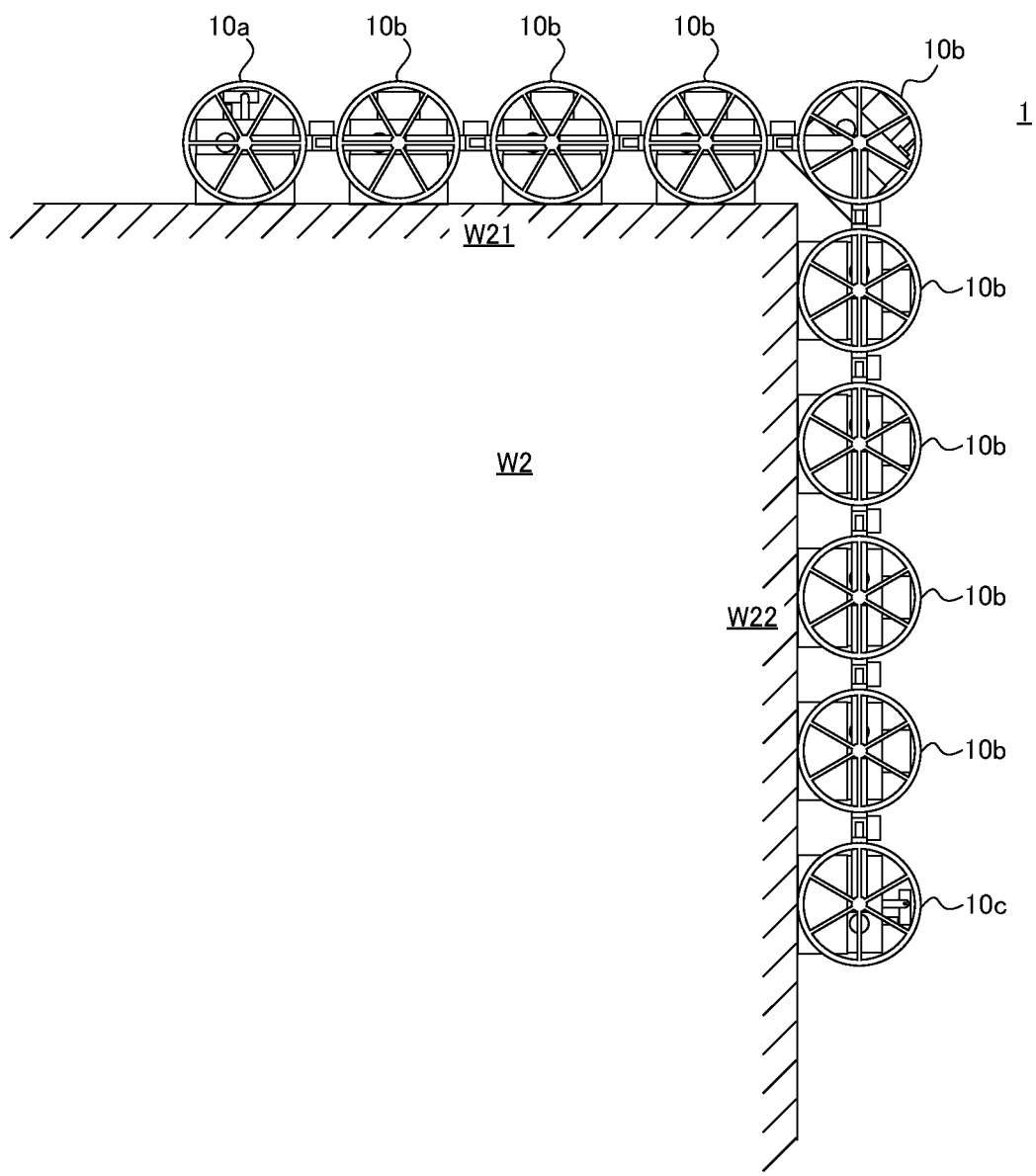
FIG. 8 is a schematic side view illustrating a moving device transitioning between two wall surfaces.
Figure 9:
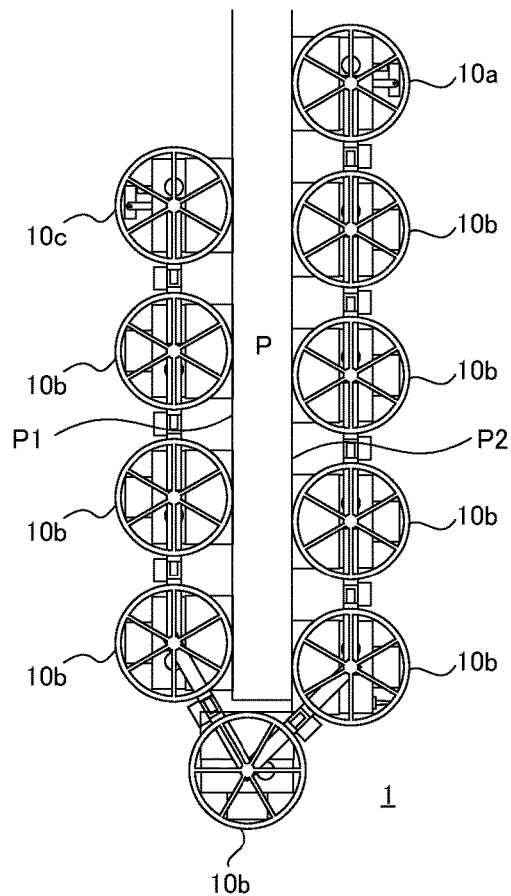
FIG. 9 is a schematic side view illustrating a moving device traversing over a protrusion.
Figure 10:
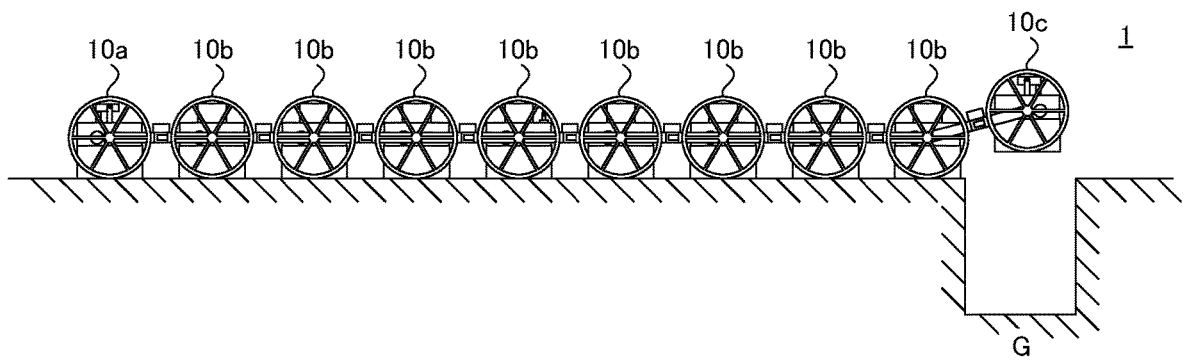
FIG. 10 is a schematic side view illustrating a moving device traversing over a groove.

The operation of the moving device is described. FIG. 6 is a schematic side view illustrating a moving device performing a rotation of bodies. FIG. 7 is a schematic side view illustrating a moving device performing a pitch operation. FIG. 8 is a schematic side view illustrating a moving device transitioning between two wall surfaces. FIG. 9 is a schematic side view illustrating a moving device traversing over a protrusion. FIG. 10 is a schematic side view illustrating a moving device traversing over a groove.

As shown in FIG. 6, when a moving device 1 traverses across a concave corner W1 on a structure for inspection where the meeting angle between a wall surface W11 and another wall surface W12 is smaller than 180°, the moving device 1 can traverse across the concave corner W1 by rotating pitch-wise, according to the angle between the wall surface W11 and the other wall surface W12, the orientation of each one of the bodies 11 of the vehicles 10 transitioning from the wall surface W11 to the other wall surface W12 sequentially from the leading end in the direction of travel.

As shown in FIG. 7, when a moving device 1 traverses across the concave corner W1, the vehicles 10 are transitioned one by one, in the order from the leading end in the direction of travel, from the wall surface W11 to the other wall surface W12, wherein a vehicle 10 in front is separated from the wall surface W11 by the first link 13a or the second link 13b of another vehicle 10 connected immediately behind and then adhered to the other wall surface W12.

As shown in FIG. 8, when a moving device 1 traverses across a convex corner W2 on a structure for inspection where the meeting angle between a wall surface W21 and another wall surface W22 is greater than 180°, the vehicles 10 are transitioned one by one in the order from the leading end in the direction of travel from the wall surface W21 to the other wall surface W22, wherein a vehicle 10 which is transitioned across the corner is supported by the first link 13a or the second link 13b of another vehicle 10 connected immediately behind, then the body 11 of the supported vehicle 10 is rotated pitch-wise and adhered to the other wall surface W12. The determination of whether or not a certain vehicle 10 has reached a corner may be made by the control unit 99 based on mutual differences in the measured values of the plurality of proximity sensors 91.

As shown in FIG. 9, when the moving device 1 has to traverse across a plate-shaped protrusion P, which protrudes from a wall surface of a structure for inspection and has a surface P1 and another surface P2 with the distance between the surfaces P1 and P2 being a predetermined thickness, the moving device 1 can traverse across the protrusion P by making the vehicles 10 transitioned one by one from the surface P1 to the other surface P2, wherein a vehicle 10 in front is supported by the first link 13a or the second link 13b of another vehicle 10 connected immediately behind and then the body 11 of the supported vehicle 10 is rotated pitch-wise. When the moving device 1 traverses across the protrusion P, it is preferable to make the distance between the main wheels 12 of two adjacent vehicles 10 in the moving device 1 smaller than the thickness of the protrusion P for preventing the protrusion P from being caught between the main wheels 12 of two adjacent vehicles 10.

As shown in FIG. 10, when a moving device 1 is to move across a wall surface formed with a groove G in the structure for inspection, the moving device 1 can pass through the wall surface formed with the groove G by supporting the vehicle 10 passing through the groove G with the first link 13a or second link 13b of another vehicle 10 immediately behind to make it go over the groove G. The detection of the groove G may be made by the control unit 99 based on mutual differences in measured values of the plurality of proximity sensors 91.

(An Alternative Configuration)

Figure 11:
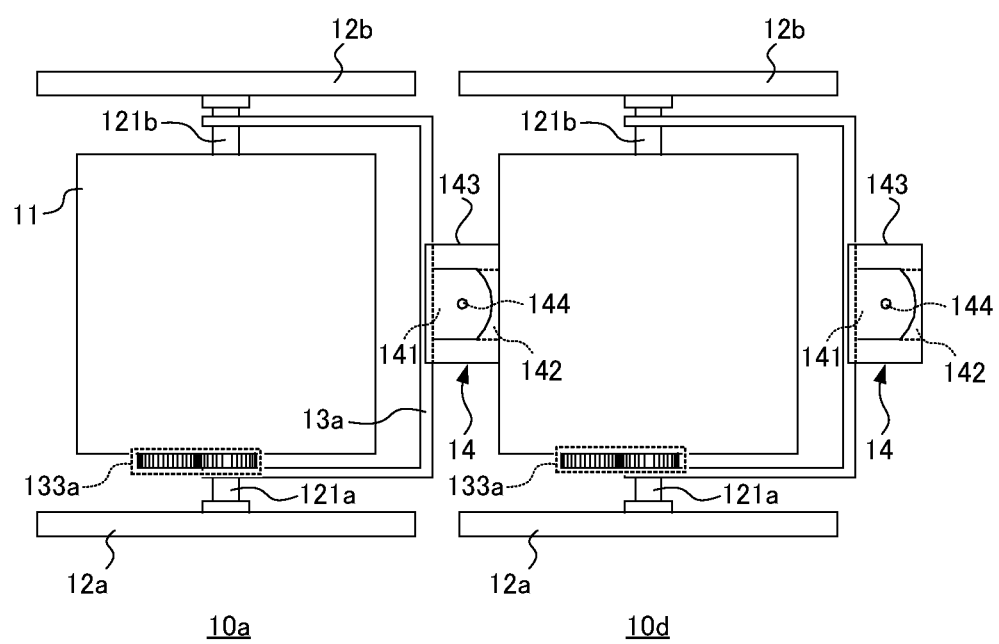
FIG. 11 is a diagram illustrating a moving device with links disposed at an alternative position.

An alternative configuration of the moving device is explained. FIG. 11 is a diagram illustrating a moving device with links disposed at an alternative position.

For vehicles 10 other than vehicle 10a in a moving device 1, its body 11 and a first link 13a from a neighboring vehicle may be connected. As shown in FIG. 11, the vehicle 10d, which corresponds to the vehicle 10b described above, does not have a second link 13b, instead the second coupling portion 142 of the coupler 14 is directly connected to the body 11 of the vehicle 10d. This configuration makes it possible to remove second links 13b from vehicles 10 in the moving device 1, and manufacture the moving device 1 at a lower cost.

In the moving device described in the present embodiment, by connecting multiple vehicles that are capable of adhering to the wall, at least some of the vehicles can adhere to the wall. Thus, the probability of adhesion of the moving device 1 as a whole may be increased, enabling the moving device 1 to move along the wall more stably and transition between two wall surfaces that form an angle with each other or between wall surfaces that are separated from each other.

A Second Embodiment

Figure 12:
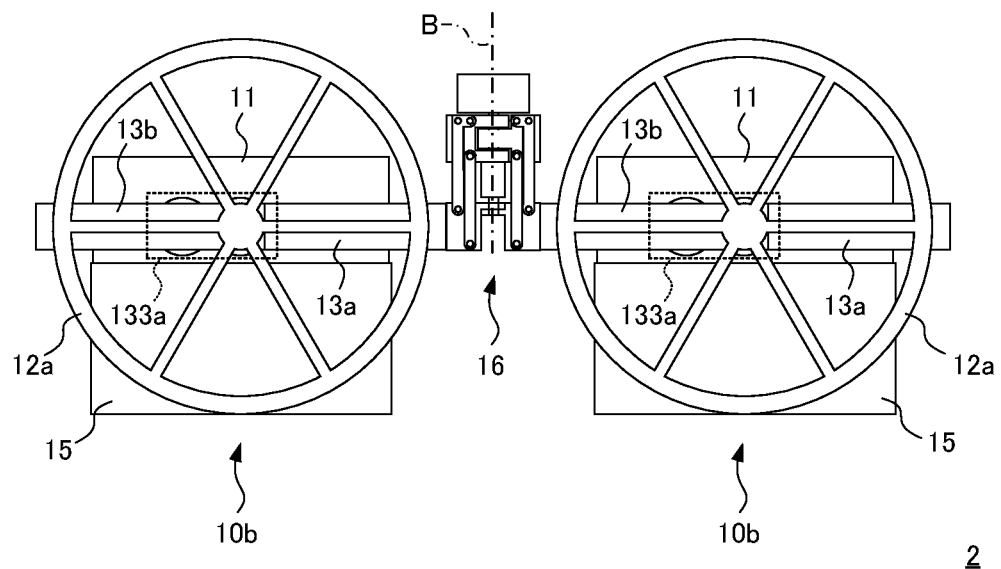
FIG. 12 is a schematic side view illustrating a moving device in a shortened state in the second embodiment.
Figure 13:
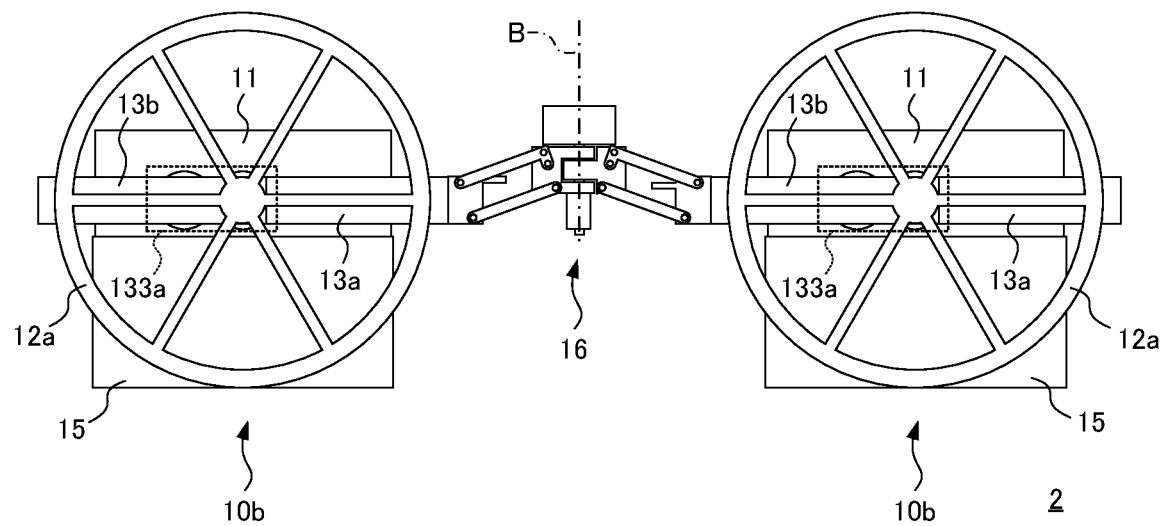
FIG. 13 is a schematic side view illustrating a moving device in an extended state in the second embodiment.
Figure 14:
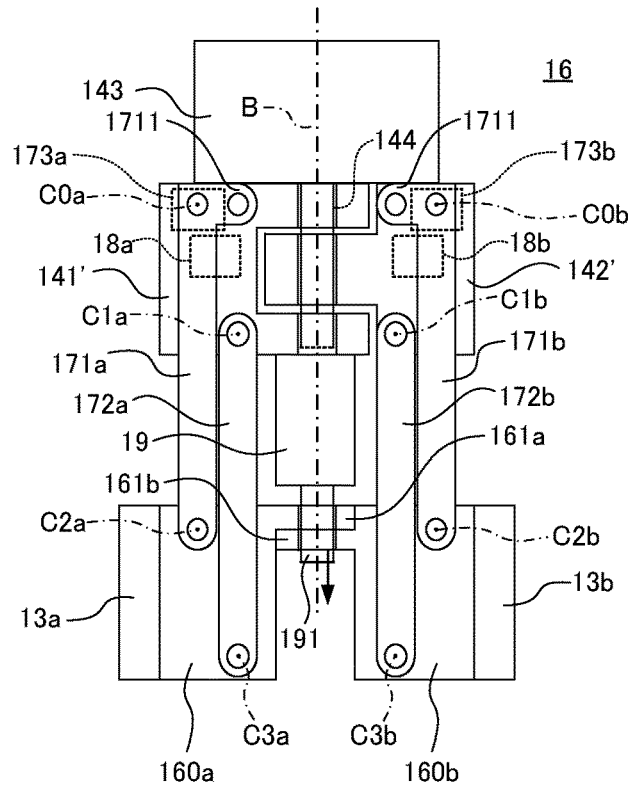
FIG. 14 shows a schematic side view illustrating a configuration of a coupler in a shortened state.
Figure 15:
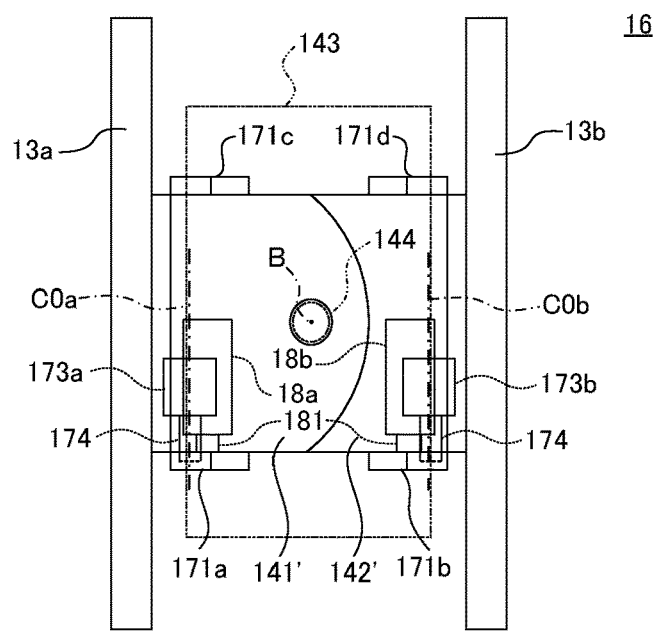
FIG. 15 is a schematic plan view illustrating a configuration of a coupler in a shortened state.
Figure 16:
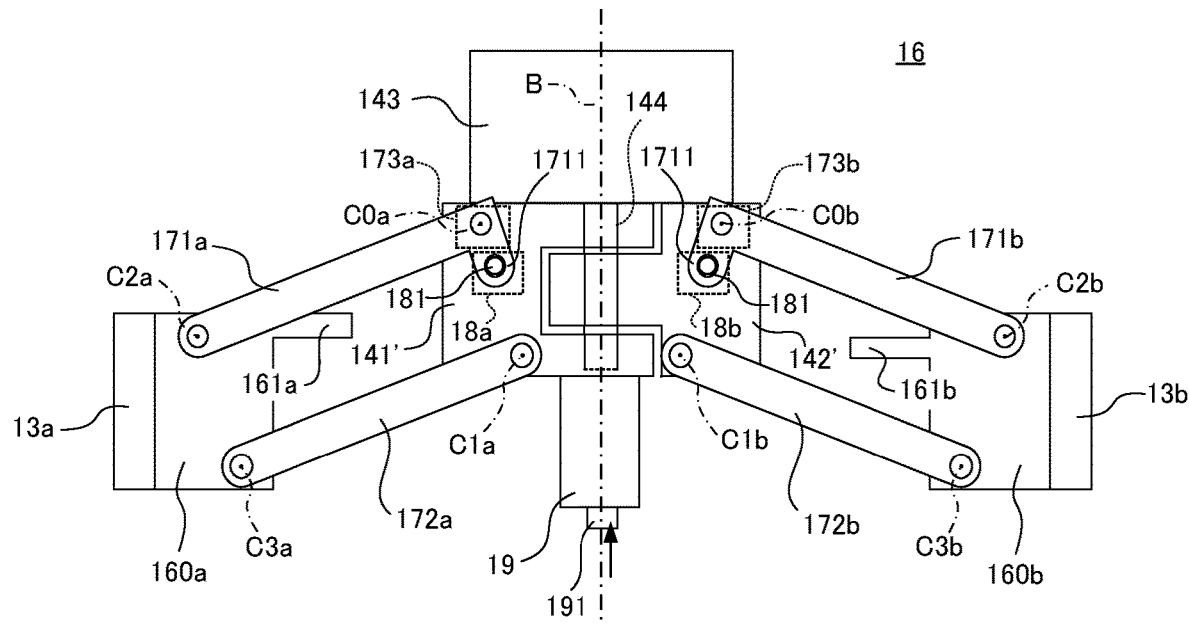
FIG. 16 is a schematic side view illustrating a configuration of the coupler in an extended state.
Figure 17:
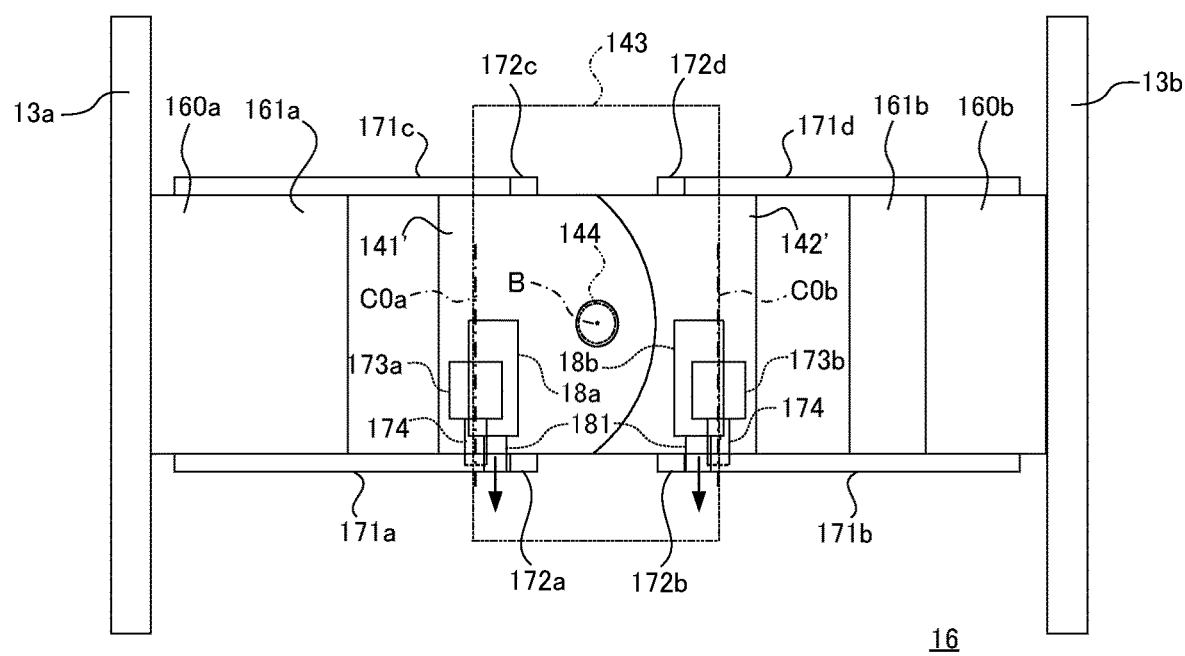
FIG. 17 is a schematic plan view illustrating a configuration of a coupler in an extended state.

A moving device according to a second embodiment is described. As this moving device differs from that of the first embodiment only in the configuration of the coupler, only the configuration of the coupler will be described. FIG. 12 is a schematic side view illustrating a moving device in a shortened state in the second embodiment. FIG. 13 is a schematic side view illustrating a moving device in an extended state in the second embodiment. FIG. 14 shows a schematic side view illustrating the configuration of a coupler in a shortened state. FIG. 15 is a schematic plan view illustrating the configuration of a coupler in a shortened state. FIG. 16 is a schematic side view illustrating the configuration of a coupler in an extended state. FIG. 17 is a schematic plan view illustrating the configuration of a coupler in an extended state.

As shown in FIGS. 12 and 13, the moving device 2 of this embodiment differs from the moving device 1 of the first embodiment in that it has a coupler 16 instead of the coupler 14. The coupler 16 differs from the coupler 14 in that it has an extension and retraction mechanism for extending and shortening the distance between two adjacent vehicles 10, which enables the moving device 2 to switch between a shortened state shown in FIG. 12 and an extended state shown in FIG. 13, and to change the distance between the two vehicles 10.

As shown in FIGS. 14 to 16, the coupler 16 includes a first coupling portion 141', a second coupling portion 142', a yaw driver 143 having a shaft 144, a first base 160a, a second base 160b, four links 171a, 171c, 172a, 172c that collapsibly connect the first coupling portion 141' to the first base 160a, and four links 171b, 171d, 172b, 172d that collapsibly connect the second coupling portion 142' to the second base 160b. Of these, the first coupling portion 141' and the second coupling portion 142' are members corresponding to the first coupling portion 141 and the second coupling portion 142 in the first embodiment, and the yaw driver 143 is the same component as in the first embodiment.

The first coupling portion 141' has a collapsing driver 173a having a shaft 174 and a locking device 18a configured as a linear solenoid having an insertion bar 181. A locking device 19 configured as a linear solenoid having an insertion bar 191 is disposed at the bottom of the first coupling portion 141'. The second coupling portion 142' has a collapsing driver 173b having a shaft 174 and a locking device 18b configured as a linear solenoid having an insertion bar 181. The collapsing drivers 173a, 173b and the locking devices 18a, 18b, 19 are controlled by the control unit 99 of the vehicle 10b disposed with the first link 13a to which the first coupling portion 141' is connected.

The first base 160a is connected to the coupling portion of the first link 13a of a first vehicle 10b of any two vehicles 10b adjacent to each other in the traveling direction, and the second base 160b is connected to the coupling portion of the second link 13b of a second vehicle 10b of the any two vehicles 10b. A locking portion 161a, which projects toward the second vehicle 10b and has a vertical through-hole, is formed in the first base 160a. A locking portion 161b, which projects toward the first vehicle 10b and has a vertical through-hole, is formed in the second base 160b.

Each of the links 171a, 171c, 172a, 172c is connected to the first coupling portion 141' at one end and to the first base 160a at the other end. Each of the links 171b, 171d, 172b, 172d is connected to the second coupling portion 142' at one end and to the second base 160b at the other end. Among the links 171a, 172a, 171c, 172c, 171b, 172b, 171d, 172d, the links 171a, 172a, 171b, 172b are disposed on one side in the lateral direction, and the links 171c, 172c, 171d, 172d are disposed on the other side in the lateral direction. The links 171a, 172a, 171b, 172b and the other links 171c, 172c, 171d, 172d are respectively disposed symmetrically to each other with the plane of symmetry that is parallel to the travel and vertical directions and contains the axis B of the shaft 144 of the yaw driver 143. Therefore, only the links 171a, 172a, 171b, 172b shown in FIG. 14 and FIG. 16 will be explained in the following description, and the explanation for the links 171c, 172c, 171d, 172d will be omitted.

The link 171a is a member extended in a direction, wherein its first end is fixedly connected to the shaft of a collapsing driver 173a which can rotate around the axis C0a oriented in the lateral direction, and its second end is rotatably connected to the first base 160a, wherein the first base 160a is rotatable around an axis C2a that is parallel to the axis C0a. The link 171a has a locking portion 1711 at the first end, wherein the locking portion 1711 extends in a direction perpendicular to the direction of extension of the link 171a and has a through-hole penetrated in the lateral direction. The link 172a is a member extended in a direction, and a first end of which is rotatably connected to the first coupling portion 141', wherein the first end of the link 172a is rotatable around an axis C1a, and the axis C1a is parallel to the axis C0a and separated from the axis C0a to the wall surface side in the vertical direction and to the second vehicle 10b side in the traveling direction. A second end of the link 172a is rotatably connected to the first base 160a, wherein the second end of the link 172a is rotatable around an axis C3a, and the axis C3a is parallel to the axis C2a and separated from the axis C2a to the wall surface side in the vertical direction and to the second vehicle 10b side in the traveling direction.

The link 171b is a member extended in a direction, wherein its first end is fixedly connected to the shaft of a collapsing driver 173b, which can rotate around the axis C0b oriented in the lateral direction, and its second end is rotatably connected to the second base 160b, wherein the second base 160b is rotatable around an axis C2b that is parallel to the axis C0b. The link 171b has a locking portion 1711 at the first end, wherein the locking portion 1711 extends in a direction perpendicular to the direction of extension of the link 171b and has a through-hole penetrated in the lateral direction. The link 172b is a member extended in a direction, and a first end of which is rotatably connected to the second coupling portion 142', wherein the first end of the link 172b is rotatable around an axis C1b, and the axis C1b is parallel to the axis C0b and separated from the axis C0b to the wall surface side in the vertical direction and to the first vehicle 10b side in the traveling direction. A second end of the link 172b is rotatably connected to the second base 160b, wherein the second end of the link 172b is rotatable around an axis C3b, and the axis C3b is parallel to the axis C2b and separated from the axis C2b to the wall surface side in the vertical direction and to the first vehicle 10b side in the traveling direction.

The links 171a, 171b can be rotated by the collapsing drivers 173a, 173b to which the links are connected respectively, and when the links are rotated, the state of the coupler 16 is switched between a shortened state and an extended state. During the switching of the state, the orientations of the first coupling portion 141', the second coupling portion 142', the first base 160a, and the second base 160b are maintained by the links 172a, 172b having the axes arranged as in the above description.

The locking device 19 has an insertion bar 191 movable in the vertical direction, and the axis of the insertion bar 191 is aligned with the axis B of the shaft 144 of the yaw driver 143. When in the shortened state shown in FIG. 14 and FIG. 15, the locking portion 161a and the locking portion 161b overlap each other so that the insertion bar 191 of the locking device 19 can go through the vertical through-holes of the locking portions 161a, 161b, and moving the insertion bar 191 of the locking device 19 to the wall surface side holds the coupler 16 in the shortened state. As the axis of the insertion bar 191 and the axis B are aligned, yawing of one of the two vehicles 10b can be done even when the coupler 16 is locked in the shortened state.

The locking devices 18a, 18b are configured in such a way that their respective insertion bars 181 are movable in the lateral directions. When in the extended state shown in FIGS. 16 and 17, the insertion bars 181 of the locking devices 18a, 18b respectively can be inserted into the through-holes formed in the locking portions 1711 of the links 171a, 171b respectively. Inserting the insertion bars 181 into the respective through-holes of the locking portions 1711 holds the coupler 16 in the extended state.

As the coupler 16 is made switchable between a shortened state and extended state, in the shortened state, it is easy for the moving device 1 to go past the protruding portion P shown in FIG. 9 as the distance between the main wheels 12 of two adjacent vehicles 20 are reduced, while in the extended state, the range of yawing can be increased as the main wheels 12 of two adjacent vehicles 20 are separated apart.

A Third Embodiment

Figure 18:
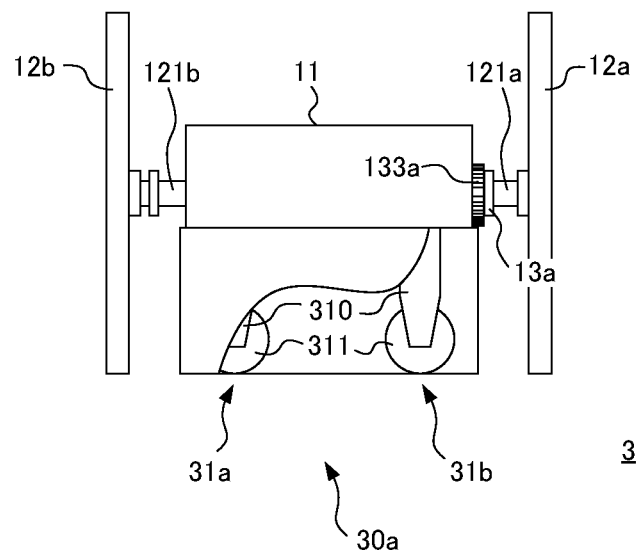
FIG. 18 is a schematic front view illustrating a moving device in the third embodiment.
Figure 19:
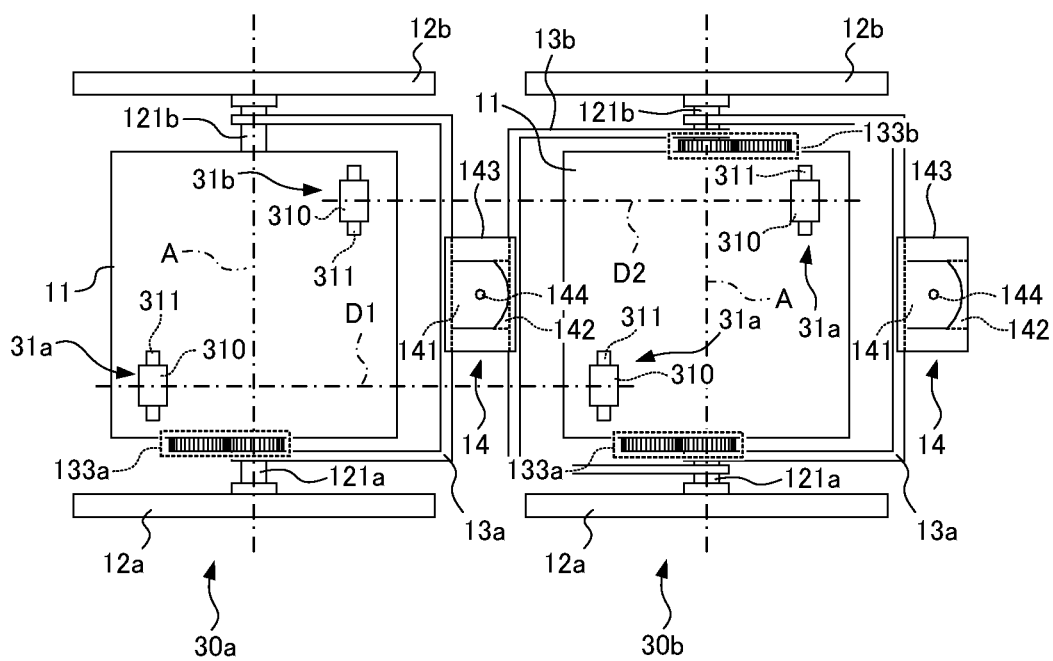
FIG. 19 is a schematic plan view illustrating a configuration of a moving device in the third embodiment.
Figure 20:
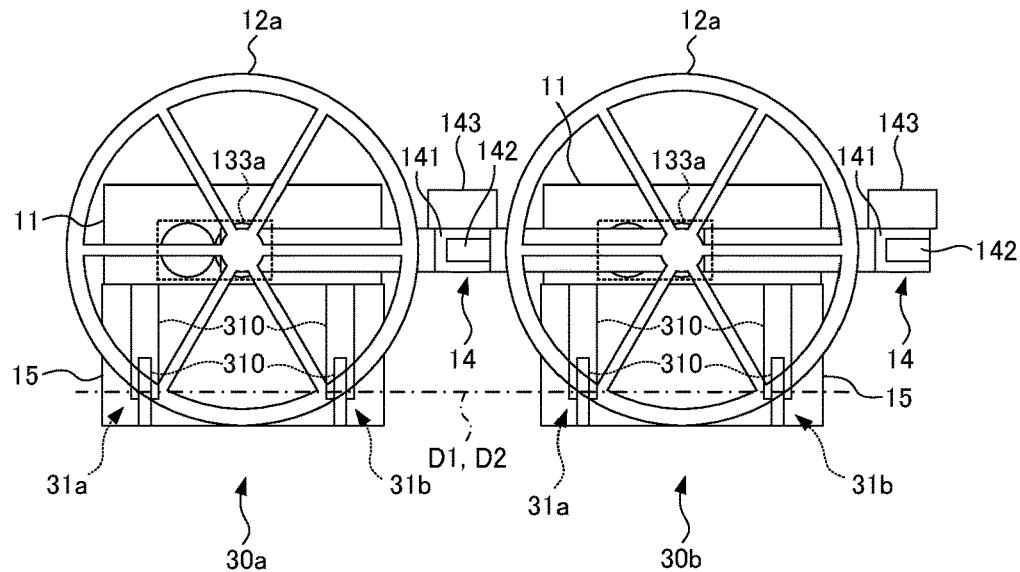
FIG. 20 is a schematic side view illustrating a configuration of a moving device in the third embodiment.

A moving device in the third embodiment is described. The moving device in this embodiment differs from the moving device in the first embodiment in that it includes lateral wheels that rotate around axes perpendicular to the axis of the main wheels. FIG. 18 is a schematic front view illustrating a moving device in the third embodiment. FIG. 19 is a schematic plan view illustrating the configuration of a moving device in the third embodiment. FIG. 20 is a schematic side view illustrating the configuration of a moving device in the third embodiment.

As shown in FIGS. 18 to 20, the plurality of vehicles 30 in the moving device 3 of the present embodiment each includes lateral wheels 31a, 31b. The lateral wheels 31a, 31b are both disposed in the adhesion space defined by the partition 15, and the lateral wheels 31a and 31b are separated from each other in the traveling and lateral directions. Each of the lateral wheels 31a, 31b has a frame 310 and a wheel 311 rotatably disposed at an end of the frame 310. The frame 310 is a vertically extended member, wherein a wheel 311 is disposed at its wall surface end and the frame 310 is fixed to the bottom of the body 11 at the other end. The wheels 311 of the lateral wheels 31a, 31b are rotatable around axes D1 and D2 respectively, which are perpendicular to the axis A of the shaft of the main wheels 12 and the vertical direction. The wheels 311 can be rotationally driven by drivers not shown in the figure. The lateral wheels 31a, 31b are configured to be vertically movable and can be switched between a contact state in which the wheels 311 are in contact with the wall surface and a separated state in which the wheels 311 are separated from the wall surface. In the contact state, the main wheels 12 are separated from the wall surface. Because of this, the partition 15 may preferably be configured to extend in the direction of the wall surface side when in the contact state.

As has been described above, the lateral wheels 31a, 31b facilitate the moving of the moving device 3 in the lateral direction and thus improve the mobility of the moving device 3.

A Fourth Embodiment

Figure 21:
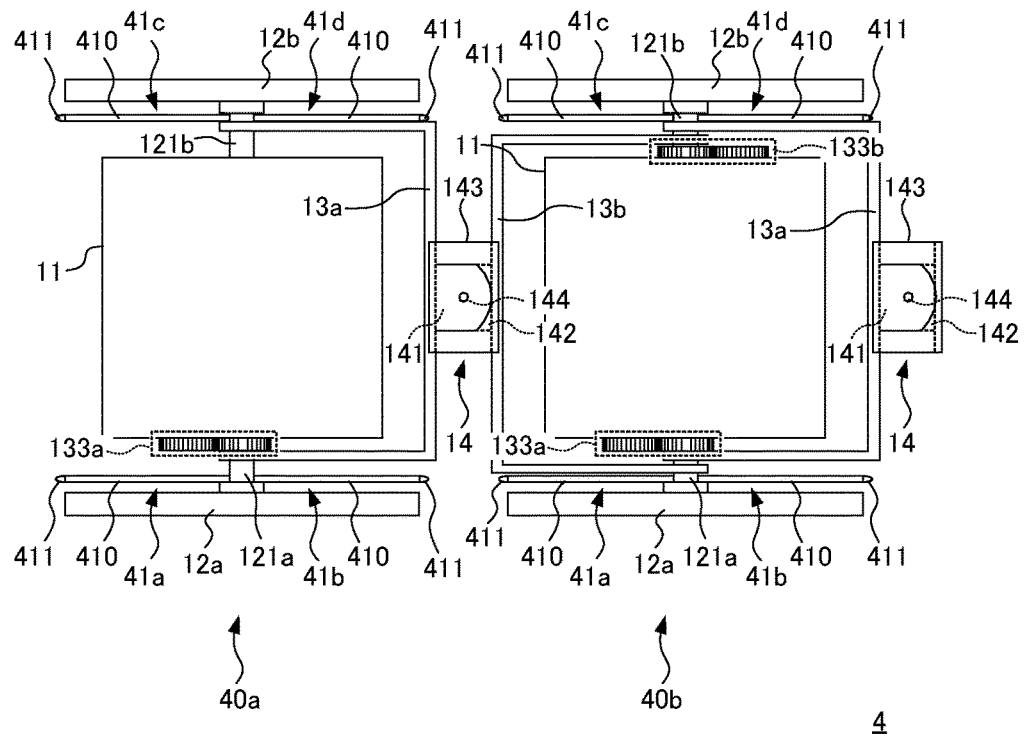
FIG. 21 is a schematic plan view illustrating a moving device in the fourth embodiment.
Figure 22:
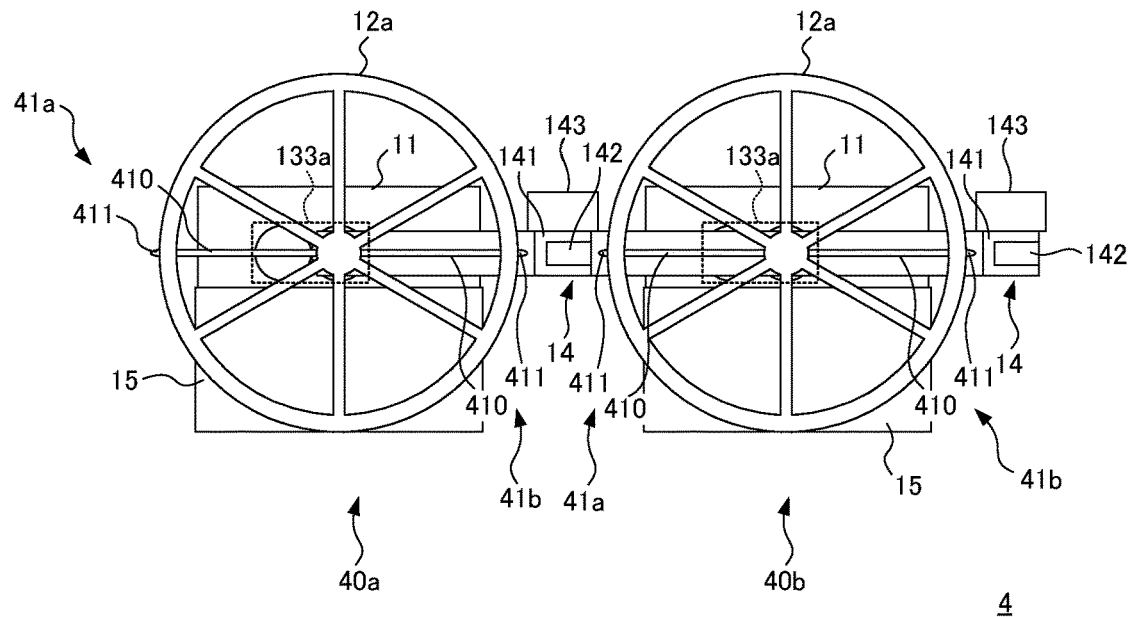
FIG. 22 is a schematic side view illustrating a configuration of a moving device in the fourth embodiment.

A moving device in the fourth embodiment is described. The moving device in this embodiment differs from the moving device in the first embodiment in that it is equipped with contact sensors. FIG. 21 is a schematic plan view illustrating a moving device in the fourth embodiment. FIG. 22 is a schematic side view illustrating the configuration of a moving device in the fourth embodiment.

As shown in FIG. 21 and FIG. 22, each of the plurality of vehicles 40 in the moving device 4 in the present embodiment has four contact sensors 41a to 41d. The four contact sensors 41a to 41d are all disposed on the shafts 121 of the main wheels 12 while the contact sensors do not rotate with the shafts 121, and are connected to the control unit 99. The contact sensors 41a, 41b are disposed on the shaft 121a, and the contact sensors 41c, 41d are disposed on the shaft 121b.

Each of the contact sensors 41 includes a sensor base 410 extended in the traveling direction and attached to the shaft 121 at one end, and a switch sensor 411 attached to the other end of the sensor base 410. Each of the contact sensors 41a, 41c is disposed on the shaft 121 in such a way that its switch sensor 411 is oriented in one direction in the traveling direction, and each of the contact sensors 41b, 41d is disposed on the shaft 121 in such a way that its switch sensor 411 is oriented in the other direction in the traveling direction.

The switch sensor 411 is a mechanical switch sensor and has a switch function in which two contacts conduct when a predetermined stroke occurs upon contact with a wall surface, and the length of the sensor base 410 is such that the switch sensor 411 protrudes from the outer diameter of the main wheel 12 by a predetermined length. Such a configuration allows the switch sensor 411 to become conductive when the main wheel 12 contacts a wall surface that is different from the wall surface on which the vehicle is moving, and allows the control unit 99 to detect a wall surface that is different from the wall surface on which the vehicle is moving.

As described above, by making the control unit 99 capable of detecting a wall surface different from the wall surface on which the vehicle is moving, the control unit 99 becomes capable of performing the operation shown in FIG. 6, which is to rotate the body 11 of the vehicle 10 that has detected the wall surface and then adhere the vehicle 10 to the detected wall surface.

In addition, the control unit 99 can perform the operation shown in FIG. 7, which is to move the moving device 4 backward after detecting a wall surface and then separate each vehicle 10, from the leading ones in turn, from the wall surface on which the vehicle has been moving and adhere the separated vehicle 10 to the detected wall surface.

A Fifth Embodiment

Figure 23:
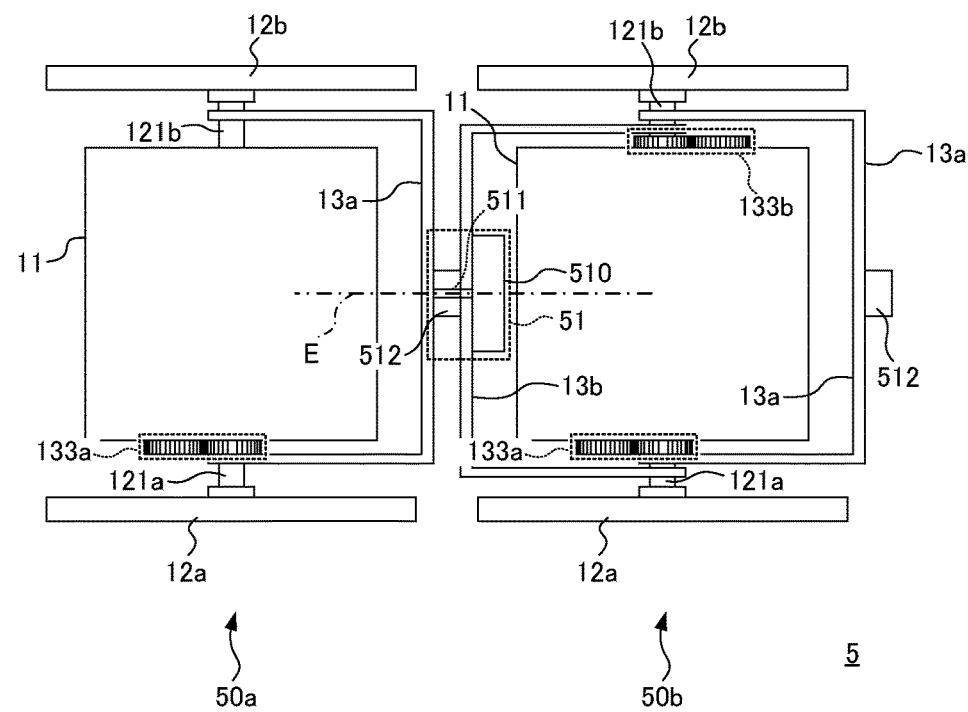
FIG. 23 is a schematic plan view illustrating a moving device in the fifth embodiment.
Figure 24:
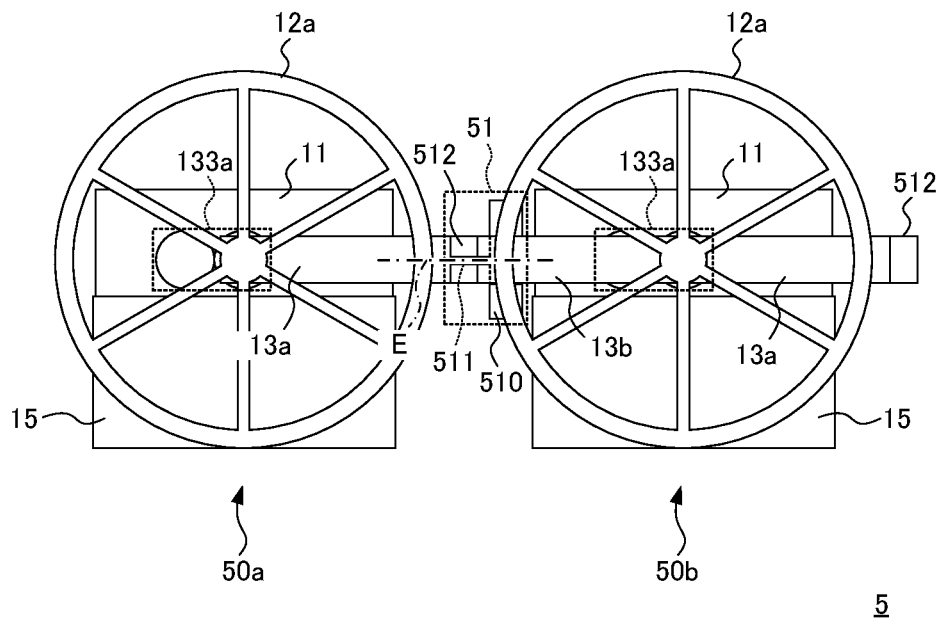
FIG. 24 is a schematic side view illustrating a configuration of a moving device in the fifth embodiment.

A moving device in the fifth embodiment is described. The moving device in this embodiment differs from the moving device in the first embodiment in that the coupler can rotate around a roll axis instead of around a yaw axis. FIG. 23 is a schematic plan view illustrating a moving device in the fifth embodiment. FIG. 24 is a schematic side view illustrating the configuration of a moving device in the fifth embodiment.

As shown in FIG. 23 and FIG. 24, two vehicles 50 adjacent to each other in the traveling direction in the moving device 5 of this embodiment are connected to each other by a coupler 51 instead of a coupler 14. The coupler 51 includes a roll driver 510 that is fixedly disposed on the coupling portion of the second link 13b in one of the vehicles 50 (vehicle 50b in FIG. 23 and FIG. 24), and a rotation portion 512 that is fixedly disposed on the coupling portion of the first link 13a in the other vehicle 50 (vehicle 50a in FIG. 23 and FIG. 24). The roll driver 510 has a shaft 511 which rotates around its axis E oriented in the traveling direction, and the shaft 511 is fixedly connected to the rotation portion 512. The roll driver 510 is controlled by either one of the control units 99 disposed on the two connected vehicles 50.

As described above, by making the two connected vehicles 50 displaceable relative to each other in the rolling direction, the moving device 5 can travel on walls that are gradually inclined.

A Sixth Embodiment

Figure 25:
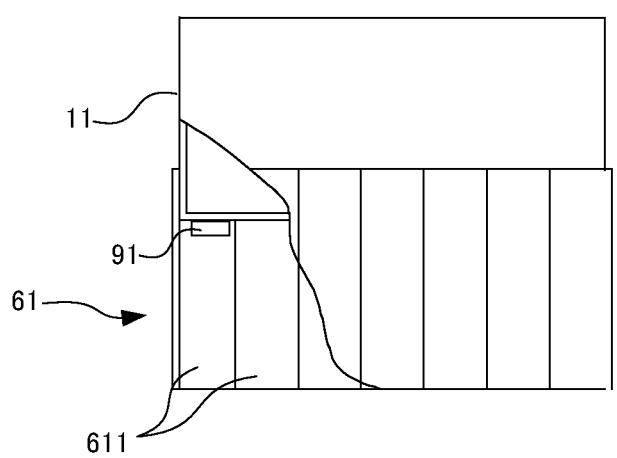
FIG. 25 is a schematic side view illustrating a configuration of a body in the sixth embodiment.
Figure 26:
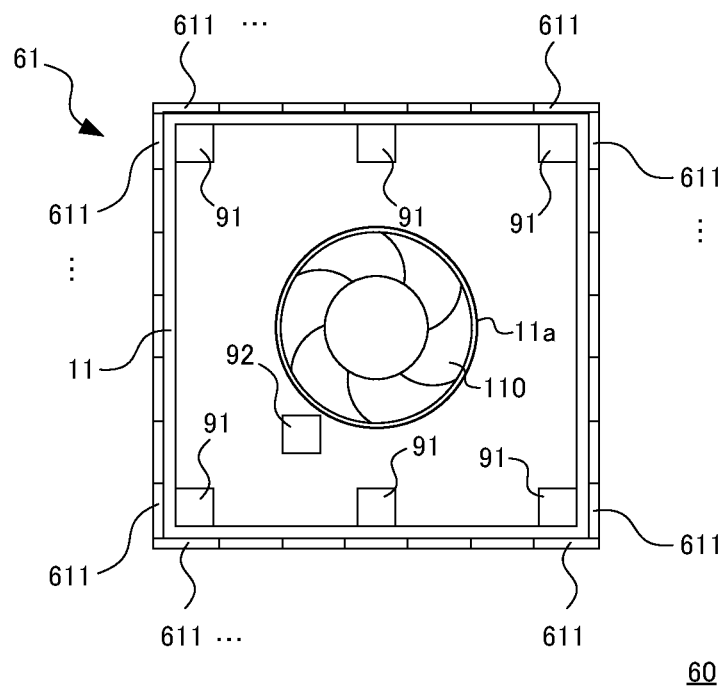
FIG. 26 is a schematic bottom view illustrating a configuration of a body in the sixth embodiment.

A moving device in the sixth embodiment is described. The moving device in this embodiment differs from the moving device in the first embodiment only in the configuration of the partition. FIG. 25 is a schematic side view illustrating the configuration of a body in the sixth embodiment. FIG. 26 is a schematic bottom view illustrating the configuration of a body in the sixth embodiment.

Each vehicle 60 in the moving device 6 of this embodiment has a partition 61 in place of the partition 15. The partition 61 is similar to the partition 15 in that an adhesion space is defined by enclosing the space between the body 11 and the wall surface from all directions perpendicular to the vertical direction, while it differs from the partition 15 in that the partition that defines the adhesion space has a plurality of partition elements 611 placed side by side in the traveling direction or lateral direction. Each of the partition elements 611 may preferably be flexible, so that the partition elements can easily overcome rivets or other protrusions on a wall surface. By defining the adhesion space with a plurality of partition elements 611, gaps created when a vehicle is overcoming protrusions can be reduced preventing the rise of air pressure in the adhesion space.

A Seventh Embodiment

Figure 27:
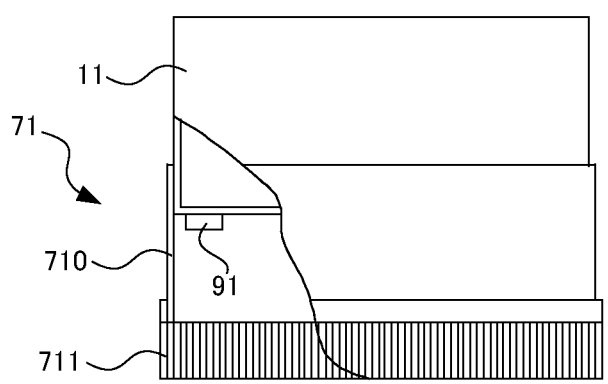
FIG. 27 is a schematic side view illustrating a configuration of a body in the seventh embodiment.
Figure 28:
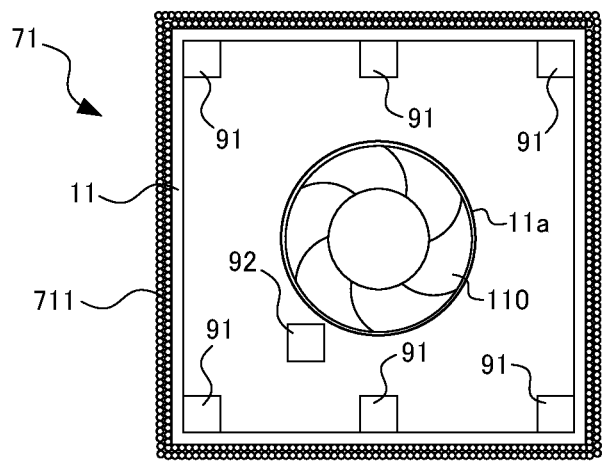
FIG. 28 is a schematic bottom view illustrating a configuration of a body in the seventh embodiment.

A moving device in the seventh embodiment is described. As with the sixth embodiment, only the configuration of the partition differs from the first embodiment of the moving device. FIG. 27 is a schematic side view illustrating the configuration of a body in the seventh embodiment. FIG. 28 is a schematic bottom view illustrating the configuration of a body in the seventh embodiment.

Each of vehicles 70 in the moving device 7 of the present embodiment has a partition 71 in place of the partition 15. The partition 71 is similar to the partition 15 in that an adhesion space is defined by enclosing the space between the body 11 and the wall surface from all directions perpendicular to the vertical direction, while it differs from the partition 15 in that the partition defining the adhesion space has an enclosure portion 710 and a fiber portion 711. Under the condition the main wheels 12 are in contact with the wall surface, the enclosure portion 710 encloses the adhesion space from all directions perpendicular to the vertical direction up to a length in vertical direction that does not reach the wall surface. The fiber portion 711 includes a plurality of fibrous members extending from the wall surface end of the enclosure portion 710 toward the wall surface, and the plurality of fibrous members are flexible and are disposed to close the separation between the enclosure portion 710 and the wall surface. The plurality of fibrous members included in the fiber portion 711 are arranged in a plurality of layers in the traveling or lateral directions as shown in FIG. 28. As the partition 71 is configured in the way described above, gaps created when a vehicle is overcoming protrusions can be reduced preventing the rise of air pressure in the adhesion space.

An Eighth Embodiment

Figure 29:
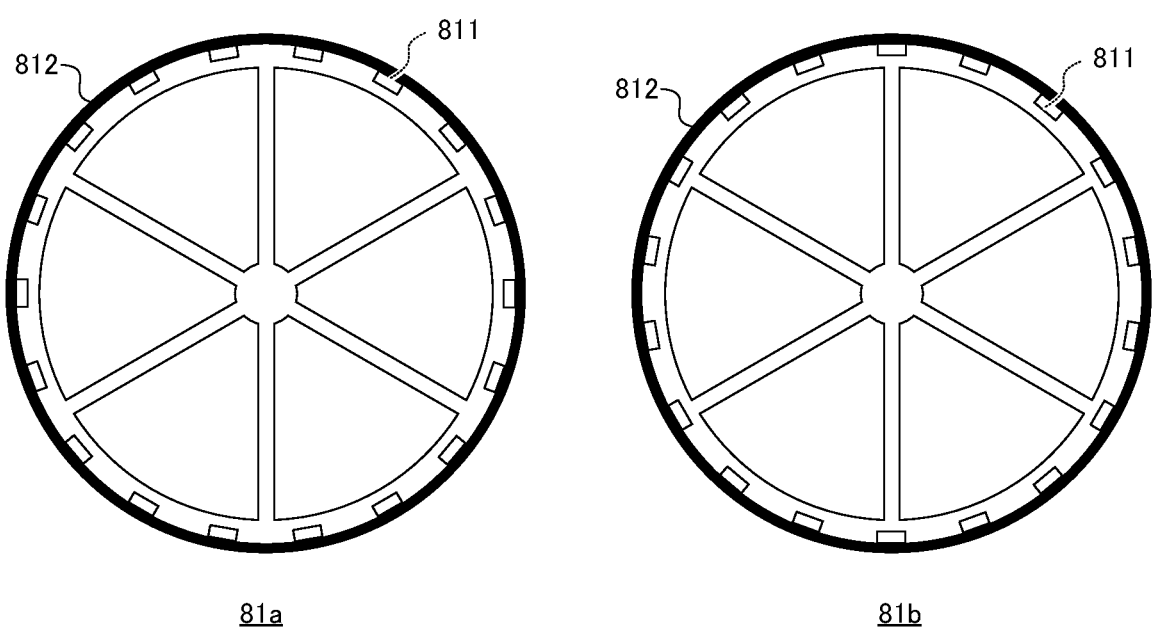
FIG. 29 is a schematic side view illustrating a configuration of main wheels in the eighth embodiment.

A moving device in the eighth embodiment is described. The moving device differs from the moving device of the first embodiment only in the configuration of the main wheels. FIG. 29 is a schematic side view illustrating the configuration of main wheels in the eighth embodiment.

The main wheels 81 in each vehicle 80 in the moving device 8 of this embodiment differs from the main wheels 12 in the first embodiment in that a main wheel 81 includes a plurality of pieces of magnetic materials 811 embedded in the main wheel 81 and an elastic body 812 formed to cover the entire outer circumference of the main wheel 81, as shown in FIG. 29. The plurality of pieces of magnetic materials 811 are arranged in the circumferential direction at predetermined intervals between each other. The plurality of pieces of magnetic materials 811 are arranged at relatively shifted positions in the circumferential direction when compared between the main wheel 81a on one side and the main wheel 81b on the other side. Such main wheels 81 facilitate a steady adhesion of each vehicle 80 on steel materials, etc., and the shifting of the arrangement positions of the plurality of pieces of magnetic materials 811 between the main wheel 81a and the other main wheel 81b enables a stable adhesion regardless of the touching position of the main wheels 81 on the wall surface.

A Ninth Embodiment

Figure 30:
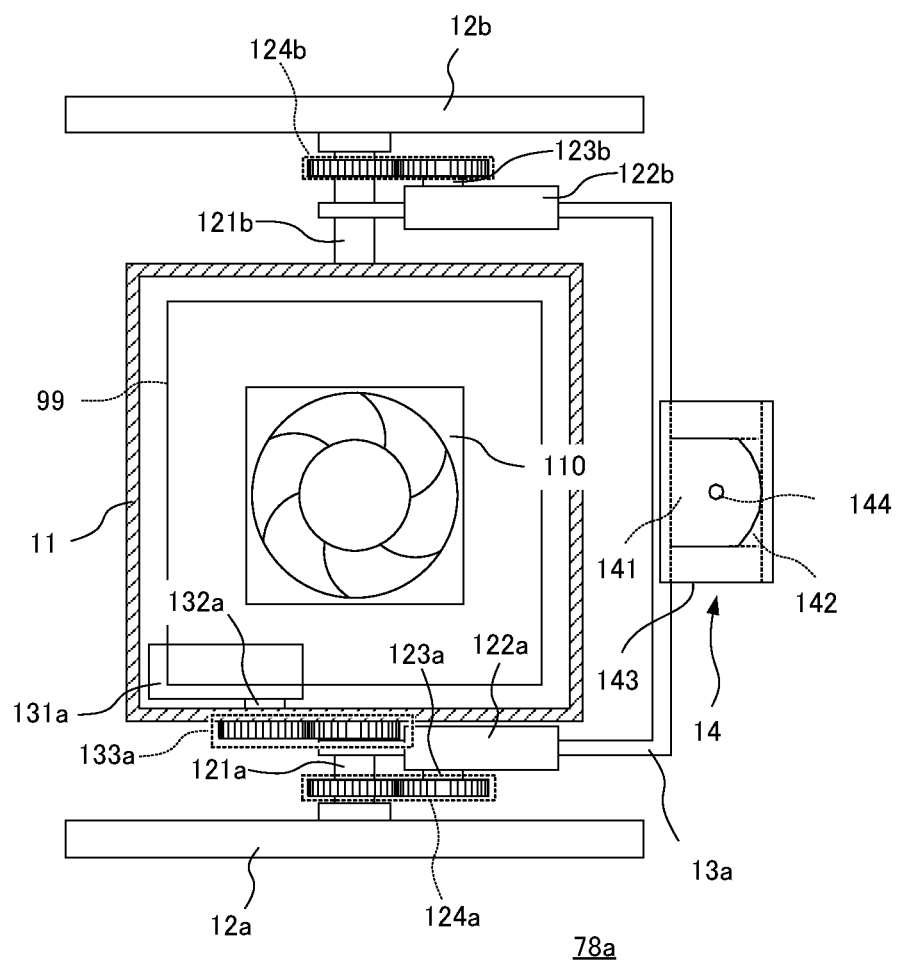
FIG. 30 is a schematic plan view illustrating a configuration of a vehicle in the ninth embodiment.

A moving device in the ninth embodiment is described. This moving device differs from the moving device of the first embodiment in the location of the traveling driver in the vehicle. FIG. 30 shows the configuration of the vehicle in the ninth embodiment. In FIG. 30, the body of the vehicle is shown in cutaway view cut with a plane parallel to the traveling and lateral directions to show the interior, and the control unit is shown transparently.

As shown in FIG. 30, in the vehicle 78a corresponding to the vehicle 10a in the first embodiment, the traveling drivers 122 are fixedly disposed on the first link 13a. The traveling driver 122a is disposed on one extension portion of the first link 13a, and the traveling driver 122b is disposed on the other extension portion of the first link 13a. The traveling drivers 122 have shafts 123 whose axes are oriented in the lateral direction.

The vehicle 78a further includes transmissions 124a, 124b corresponding to the traveling drivers 122a, 122b respectively. Each of the transmissions 124 has two gears that mesh with each other, where one of the gears is fixedly connected to the shaft 123 of the traveling driver 122, and the other one is fixedly connected to the shaft 121. As a result, the driving forces of the traveling drivers 122 disposed on the first link 13a are transmitted to the shafts 121 of the main wheels 12.

A Tenth Embodiment

Figure 31:
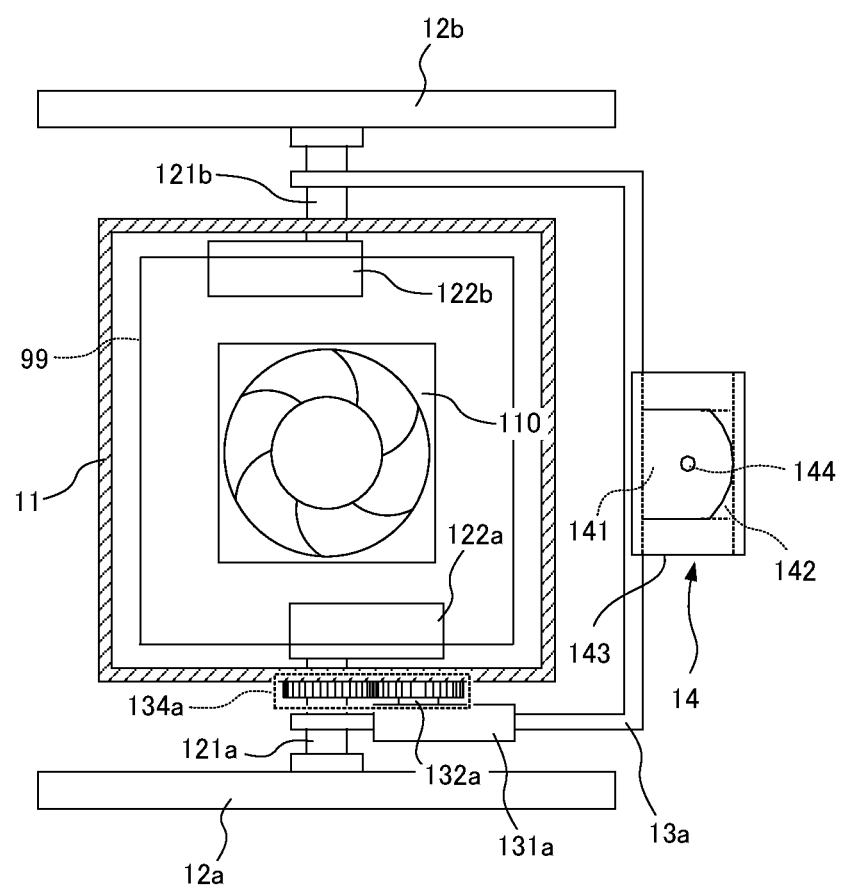
FIG. 31 is a schematic plan view illustrating a configuration of a vehicle in the tenth embodiment.

A moving device in the tenth embodiment is described. The placement position of the pitch driver in the vehicle in this moving device differs from that of the moving device in the first embodiment. FIG. 31 shows the configuration of a vehicle in the tenth embodiment. In FIG. 31, the body of the vehicle is shown in cutaway view cut with a plane parallel to the traveling and lateral directions to show the interior, and the control unit is shown transparently.

As shown in FIG. 31, in the vehicle 79a corresponding to the vehicle 10a in the first embodiment, a pitch driver 131a is fixedly disposed on the first link 13a, wherein the pitch driver 131a is disposed on one of the extension portions of the first link 13a.

The vehicle 79a has, in place of the transmission 133a, a transmission 134a having two gears wherein the two gears mesh with each other and one of the gears is fixedly connected to the shaft 132a of the pitch driver 131a, and the other gear is rotatably disposed on the shaft 121a and fixedly connected to the body 11. As a result, the driving force of the pitch driver 131a on the first link 13a rotates the first link 13a relative to the shaft 121 around the axis A.

The embodiment of the present invention has been presented by way of example only, and is not intended to limit the scope of the invention. The novel embodiment described herein may be embodied in a variety of other forms; furthermore, various omissions, substitutions and changes may be made without departing from the spirit of the invention. The embodiment and modifications are included in the scope or spirit of the present invention and in the appended claims and their equivalents.

REFERENCE SIGNS LIST

1: moving device
12: main wheel
121: shaft
122: traveling driver
15: partition (adhesion mechanism)
110: fan (adhesion mechanism)

The invention claimed is:
1. A moving device for moving on a wall surface comprising:
at least two or more vehicles each comprising:
a body,
two first wheels disposed on the body and each rotatable around a shaft for moving on the wall surface,
two rotation drivers which rotate each of the two first wheels respectively,
an adhesion mechanism which is disposed on the body and adheres to the wall surface, and
a link, wherein:
the link extends in a direction perpendicular to an axis of the shaft beyond circumferences of the two first wheels,
one end of the link is connected to the shaft in a manner rotatable around the shaft, and rotatable relative to the two first wheels, and
one or multiple couplers that connect every vehicle located adjacent to each other in a traveling direction of the at least two or more vehicles, wherein the one or multiple couplers located at the other end of the link belonging to each of the at least two or more vehicles connect between the vehicles located adjacent to each other in the traveling direction.

2. The moving device according to claim 1, wherein each of the at least two or more vehicles further comprises a pitch driver that rotates the body relative to the link around the shaft.

3. The moving device according to claim 2, wherein the body in each of the at least two or more vehicles is formed smaller than a diameter of the two first wheels when viewed from a direction of the shaft.

4. The moving device according to claim 1, wherein the one or multiple couplers comprise a yaw driver that rotates the at least two or more vehicles relative to each other around a yaw axis that is perpendicular to the traveling direction and the axis of the shaft.

5. The moving device according to claim 1, wherein the one or multiple couplers comprise a roll driver that rotates the at least two or more vehicles relative to each other around a roll axis parallel to the traveling direction.

6. The moving device according to claim 1, wherein the one or multiple couplers comprise a collapsing mechanism that lengthens and shortens a distance in the traveling direction between two vehicles connected to each other.

7. The moving device according to claim 1, wherein the adhesion mechanism generates a negative pressure in a space between the body and the wall surface to adhere onto the wall surface.

8. The moving device according to claim 7, wherein each of the at least two or more vehicles comprises a pressure sensor that measures pressure in the space between the body and the wall surface.

9. The moving device according to claim 1, wherein each of the at least two or more vehicles comprises a distance sensor that measures a distance between the vehicle and the wall surface.

10. The moving device according to claim 1, wherein each of the at least two or more vehicles comprises a contact sensor that protrudes a predetermined distance in a radial direction from an outer diameter of the two first wheels and detects a contact with a wall surface different from the wall surface with which the two first wheels are in contact.

11. The moving device according to claim 1, wherein each of the at least two or more vehicles further comprises second wheels whose axes of rotation are oriented in the traveling direction.

12. The moving device according to claim 1, wherein:
each of the two first wheels comprises a plurality of pieces of magnetic materials that are arranged in a circumferential direction of the first wheel at predetermined intervals between each other.

13. The moving device according to claim 2, wherein the one or multiple couplers comprise a yaw driver that rotates the at least two or more vehicles relative to each other around a yaw axis that is perpendicular to the traveling direction and the axis of the shaft.

14. The moving device according to claim 3, wherein the one or multiple couplers comprise a yaw driver that rotates the at least two or more vehicles relative to each other around a yaw axis that is perpendicular to the traveling direction and the axis of the shaft.

15. The moving device according to claim 2, wherein the one or multiple couplers comprise a roll driver that rotates the at least two or more vehicles relative to each other around a roll axis parallel to the traveling direction.

16. The moving device according to claim 3, wherein the one or multiple couplers comprise a roll driver that rotates the at least two or more vehicles relative to each other around a roll axis parallel to the traveling direction.

17. A moving device for moving on a wall surface comprising:
at least two or more vehicles each comprising:
a body,
two first wheels disposed on the body and each rotatable around a shaft for moving on the wall surface,
two rotation drivers which rotate each of the two first wheels respectively, and
an adhesion mechanism which is disposed on the body and adheres to the wall surface, and
one or multiple couplers that connect every vehicle located adjacent to each other in a traveling direction of the at least two or more vehicles, wherein the one or multiple couplers comprise a yaw driver that rotates the at least two or more vehicles relative to each other around a yaw axis that is perpendicular to the traveling direction and an axis of the shaft.

18. A moving device for moving on a wall surface comprising:
at least two or more vehicles each comprising:
a body,
two first wheels disposed on the body and each rotatable around a shaft for moving on the wall surface,
two rotation drivers which rotate each of the two first wheels respectively, and
an adhesion mechanism which is disposed on the body and adheres to the wall surface, and
one or multiple couplers that connect every vehicle located adjacent to each other in a traveling direction of the at least two or more vehicles, wherein each of the at least two or more vehicles comprises a contact sensor that protrudes a predetermined distance in a radial direction from an outer diameter of the two first wheels and detects a contact with a wall surface different from the wall surface with which the two first wheels are in contact.

* * * * *